United States Patent
O'Shea et al.

(10) Patent No.: US 11,640,365 B2
(45) Date of Patent: *May 2, 2023

(54) SYSTEM FOR LINK MANAGEMENT BETWEEN MULTIPLE COMMUNICATION CHIPS

(71) Applicant: Apple Inc., Cupertino, CA (US)

(72) Inventors: Helena Deirdre O'Shea, San Jose, CA (US); Camille Chen, Cupertino, CA (US); Vijay Kumar Ramamurthi, Milpitas, CA (US); Alon Paycher, Beit Hanania (IL); Matthias Sauer, San Jose, CA (US); Bernd W. Adler, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,325

(22) Filed: Oct. 13, 2021

(65) Prior Publication Data

US 2022/0035757 A1 Feb. 3, 2022

Related U.S. Application Data

(63) Continuation of application No. 16/885,889, filed on May 28, 2020, now Pat. No. 11,176,069.

(Continued)

(51) Int. Cl.
*G06F 13/36* (2006.01)
*G06F 13/362* (2006.01)
(Continued)

(52) U.S. Cl.
CPC ...... *G06F 13/3625* (2013.01); *G06F 11/3051* (2013.01); *G06F 11/3409* (2013.01);
(Continued)

(58) Field of Classification Search
CPC .. G06F 13/00; G06F 13/3625; G06F 11/3051; G06F 11/3409; G06F 13/24; G06F 13/28; G06F 2213/0038
See application file for complete search history.

(56) References Cited

U.S. PATENT DOCUMENTS 6,981,073 B2 * 12/2005 Wang ............... G06F 13/28
710/28
11,176,069 B2 * 11/2021 O'Shea ............... G06F 13/24
(Continued)

OTHER PUBLICATIONS

PCT International Search Report and Written Opinion, PCT Application No. PCT/US2020/063735, dated Mar. 18, 2021, 14 pages.
(Continued)

*Primary Examiner* — Henry Tsai
*Assistant Examiner* — Kim T Huynh

(57) ABSTRACT

Embodiments relate to an integrated circuit of an electronic device that coordinates activities with another integrated circuit of the electronic device. The integrated circuit includes an interface circuit and a processor circuit. The interface circuit communicates over a multi-drop bus connected to multiple electronic components. The processor circuit receives an authorization request from the integrated circuit via the interface circuit and the multi-drop bus. The received authorization request relates to authorization to perform an activity on the other integrated circuit. In response to receiving the authorization request, the processor circuit determines whether the other integrated circuit is authorized to execute the activity. In response to determining that the other integrated circuit is authorized to execute the activity, the processor circuit sends, to the other integrated circuit over a configurable direct connection, an authorization signal authorizing the other integrated circuit to execute the activity.

20 Claims, 12 Drawing Sheets

Related U.S. Application Data

(60) Provisional application No. 62/957,048, filed on Jan. 3, 2020.

(51) Int. Cl.
*G06F 13/24* (2006.01)
*G06F 11/34* (2006.01)
*G06F 11/30* (2006.01)
*G06F 13/28* (2006.01)

(52) U.S. Cl.
CPC .............. *G06F 13/24* (2013.01); *G06F 13/28* (2013.01); *G06F 2213/0038* (2013.01)

(56) References Cited

U.S. PATENT DOCUMENTS

| | | |
|---|---|---|
| 2010/0110934 A1 | 5/2010 | Li et al. |
| 2012/0031121 A1 | 12/2012 | Pullagoundapatti et al. |
| 2015/0095622 A1 | 4/2015 | Yoshida et al. |
| 2018/0232324 A1 | 8/2018 | Mishra et al. |
| 2019/0171588 A1 | 6/2019 | Mishra et al. |
| 2019/0227962 A1* | 7/2019 | O'Shea ............... G06F 13/4282 |
| 2022/0035757 A1* | 2/2022 | O'Shea .................. G06F 13/28 |

OTHER PUBLICATIONS

United States Office Action, U.S. Appl. No. 16/885,889, dated Jun. 25, 2021, 18 pages.
United States Office Action, U.S. Appl. No. 16/885,889, dated Apr. 29, 2021, 17 pages.

* cited by examiner

SYSTEM FOR LINK MANAGEMENT BETWEEN MULTIPLE COMMUNICATION CHIPS

CROSS REFERENCE TO RELATED APPLICATIONS

This application is a continuation of co-pending U.S. application Ser. No. 16/885,889, filed May 28, 2020, which claims benefit of U.S. Provisional Patent Application Ser. No. 62/957,048, filed Jan. 3, 2020, each of which is hereby incorporated by reference in its entirety.

BACKGROUND

1. Field of the Disclosure

The present disclosure relates to coordinating operations of multiple integrated circuit (IC) chips in an electronic device.

2. Description of the Related Art

Electronic devices may include multiple systems on chips (SOCs) for communicating with other devices using various communication protocols. As the size of a communication system in an electronic device becomes smaller while the functionality of the communication system increases, more SOCs are incorporated into the electronic device or more subsystems are added to each SOC. These SOCs may communicate with a host (e.g., a central processor or an application processor) over a dedicated communication path (e.g., peripheral component interconnect express (PCIe)) to transmit data.

As a result of integrating multiple communication systems and other subsystems in the electronic device, various issues or complications may arise. These issues or complications include, among others, collision in terms of resource usage, interference in shared or overlapping communication bands, mutually incompatible modes of operations, isolation between antennas, and transmit power management among various concurrently active SOCs. In conventional electronic devices, such issues or complications are generally resolved by coordinating the operations of the SOCs by having the central processor resolve problematic situations by coordinating operations across the multiple SOCs.

SUMMARY

Embodiments relate to an integrated circuit (e.g., a system on chip (SOC)) of an electronic device that coordinates activities with another integrated circuit (e.g., another SOC) of the electronic device. The SOC includes an interface circuit and a processor circuit. The interface circuit communicates over a multi-drop bus or a point-to-point connection that is connected to one or more communication chips (e.g., SOCs) in the electronic device. The processor circuit receives an authorization request from the other SOC via the interface circuit and/or the multi-drop bus (or a point-to-point connection), the authorization request seeking an authorization to perform an activity on the other SOC. The processor circuit determines whether the other SOC is authorized to execute the activity responsive to receiving the authorization request. In response to determining that the other SOC is authorized to execute the activity, the processor circuit sends to the other SOC, over a configurable direct connection, an authorization signal authorizing the other SOC to execute the activity. The other SOC may be also authorized to execute an activity on behalf of the SOC.

Figure 1:
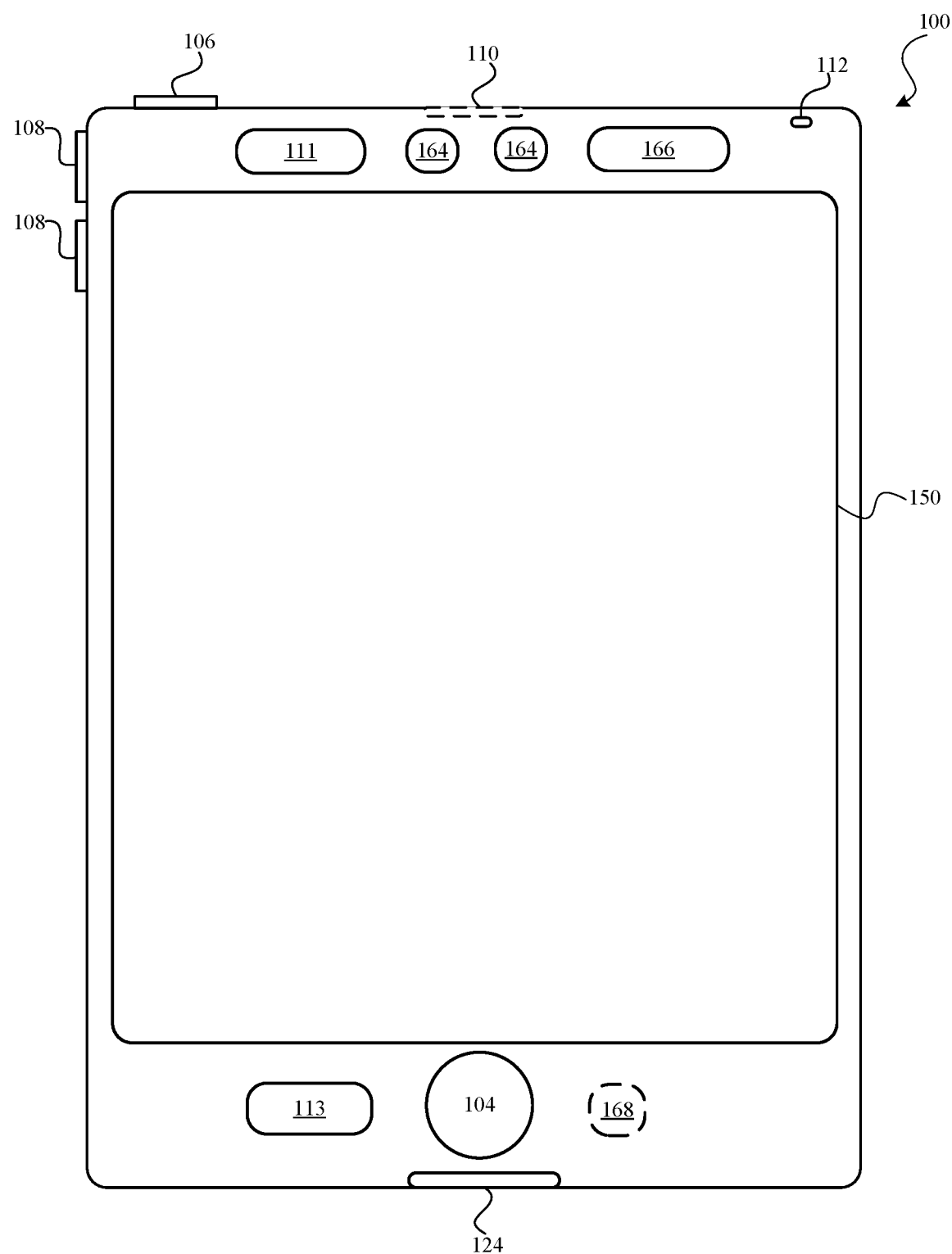
FIG. 1 is a high-level diagram of an electronic device, according to one embodiment.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to coordinating operations of subsystems in a communication system of an electronic device including a first integrated circuit (e.g., a first system on chip (SOC)) and a second integrated circuit (e.g., a second SOC or a coexistence hub device) that communicate with each other over a multi-drop bus (or a point-to-point connection) and a configurable direct connection. The second integrated circuit may receive an authorization request from the first integrated circuit via the multi-drop bus where the authorization request seeks an authorization to perform an activity on the first integrated circuit using one or more resources of the second integrated circuit. After the second integrated circuit determines whether the first integrated circuit is authorized to execute the activity, the second integrated circuit may send, to the first integrated circuit over the configurable direct connection, an authorization signal authorizing the first integrated circuit to execute the activity or a denial signal denying the first integrated circuit to execute the activity. In one or more embodiments, the first integrated circuit proceeds with assumed authorization for executing the activity. In such cases, the first integrated circuit may simply notify the second integrated circuit of an intended action of the first integrated circuit assuming an implied response by the second integrated circuit. In one or more other embodiments, the first integrated circuit sends, to the second integrated circuit, an authorization request over a multi-drop bus (or a point-to-point connection) seeking authorization for execution of an activity, and the first integrated circuit may rely on the second integrated circuit to complete the activity if conditions permit.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as touch screen 150, one or more components may also be located on an opposite side of device 100. For example, front side of device 100 may include an infrared image sensor 164 for face recognition and another image sensor 164 as the front camera of device 100. The back side of device 100 may also include additional image sensors 164 as the rear cameras of device 100.

Example Communication System in Electronic Device

Figure 2:
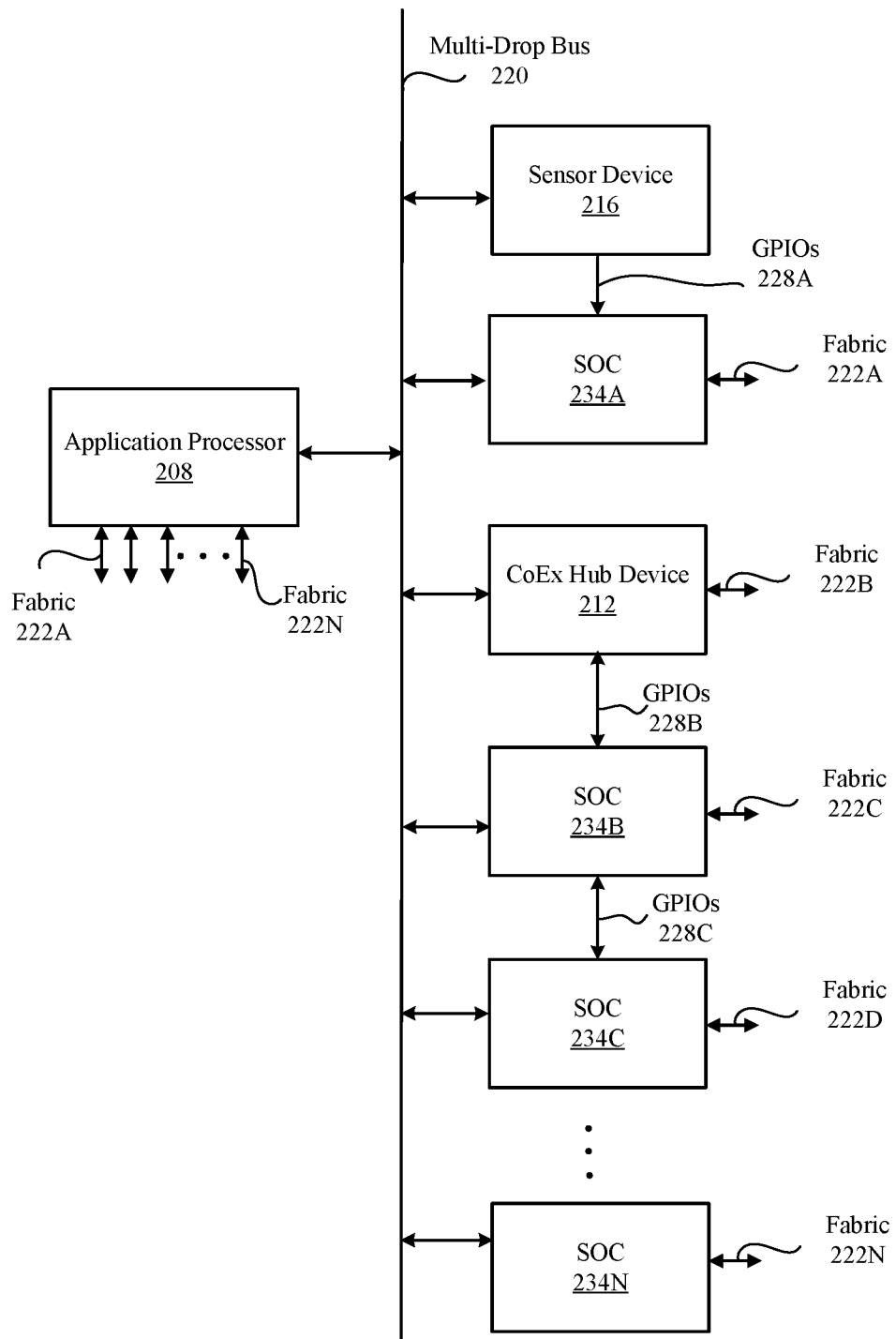
FIG. 2 is a block diagram illustrating components of the electronic device communicating over a multi-drop bus and configurable direct connections, according to one embodiment.

FIG. 2 is a block diagram illustrating components of electronic device 100 communicating over a multi-drop bus 220, according to one embodiment. Electronic device 100 may include, among other components, an application processor 208 (also referred to as "a central processor" herein), a coexistence hub device 212 (also referred to as "a coexistence hub device" herein), SOCs 234A through 234N (collectively referred to as "SOCs 234" herein), a sensor device 216, multi-drop bus 220, and fabrics 222A through 222N (collectively referred to as "fabrics 222" herein). The components illustrated in FIG. 2 may be part of a communication subsystem in electronic device 100. Electronic device 100 may include additional components (e.g., user interfaces) not illustrated in FIG. 2.

Application processor 208 is a processing circuit in electronic device 100 for executing various operations. Application processor 208 may include one or more processing cores for executing various software programs as well as dedicated hardware circuits for performing specialized functions such as processing images, performing security operations, performing machine learning operations, and processing audio signals. Application processor 208 may also execute operations to coordinate the operations of other components in electronic device 100 including coexistence hub device 212, SOCs 234 and sensor device 216. Application processor 208 may comprise firmware or hardware that is essential for the end-to-end functional behavior of a given SOC. For example, SOC 234C may not be fully independent, and SOC 234C may rely on application processor 208 to engage on multi-drop bus 220 to assist SOC 234C with coexistence and higher layer software support when communicating with, e.g., SOC 234B. Application processor 208 can operate in multiple power modes including a low power mode where application processor 208 turns off most of its components to save power consumption, and a high-power mode where most of its components are active. Application processor 208 may also incorporate one or more communication components (e.g., cellular modem) that may also be embodied as a separate SOC.

Coexistence hub device 212 is hardware, software firmware or combinations thereof, that coordinates the operations of a communication system (including, e.g., coexistence hub device 212 and SOCs 234) and related components (e.g., sensor device 216) in electronic device 100. For this purpose, coexistence hub device 212 stores and executes an operation policy for defining and/or coordinating the operations of the communication system and the related components. Coexistence hub device 212 may also play a proactive role on multi-drop bus 220 to coordinate its actions with application processor 208 as well as with other clients on multi-drop bus 220 (e.g., SOCs 234 and/or sensor device 216). The operation policy may for, example, determine real time operations of components in the communication system (e.g., SOCs 234) based on factors such as operating conditions of the communication system. Coexistence hub device 212 may also include one or more communication subsystems that perform communication operations over various physical interfaces. By locally performing such coexistence operations at the communication subsystem, application processor 208 may be retained in the low power mode for a longer time despite activities in the communication subsystem, and also frees the resources of application processor 208 during its high power mode. The details of coexistence hub device 212 are described below in detail with reference to FIG. 3. Coexistence hub device 212 may also perform functions other than coordinating the operations that were performed by application processor 208.

Each of SOCs 234 is a circuit that, by itself or in conjunction with software or firmware, performs operations for communicating with one or more external networks or devices using communication protocols or security protocols. It should be noted that this does not imply that each of SOCs 234 is fully independent. At least a portion of the firmware and/or software that is essential for a behavior of SOC on device 100 may reside, e.g., on application processor 208 due to the complexity of interactions with other components on multi-drop bus 220, or may be heavily reliant on another SOC on device 100 due to sharing of radio components or use of overlapping or nearby spectrum. Each of SOCs 234 and coexistence hub device 212 may handle different communication protocols and/or are associated with different wireless bands. For example, SOC 234A may perform processing for long range communication (e.g., cellular communication), SOC 234B or coexistence hub device 212 handles short range communication (e.g., Bluetooth communication), and SOC 234C may perform processing for, e.g., WiFi communication. The operations of SOCs 234 are at least partially controlled by coexistence hub device 212. An example of SOC 234B is described below in detail with reference to FIG. 4. A pair of SOCs (e.g., SOC 234B and SOC 234C) can cooperate between each other using multi-drop bus 220 or a general-purpose input/output (GPIO) communications (e.g., GPIOs 228C). More details about cooperation between the pair of SOCs or between coexistence hub device 212 and a SOC are described below in detail with reference to FIGS. 5-7.

Sensor device 216 is a hardware component, by itself or in conjunction with software of firmware, that senses various properties. Sensor device 216 generates sensor signals representing the sensed properties that can be sent to other components (e.g., SOCs 234, coexistence hub device 212, and application processor 208) for further processing. Sensor device 216 may be a global navigation satellite system (GNSS) module for enhancing reception of cellular wireless signals or connectivity systems such as WiFi at SOC 234A. In the case when sensor device 216 has no connection with multi-drop bus 220, sensor device 216 may rely on, e.g., SOC 234A to be a conduit of sensor device 216 for any event occurring outside of device 100. Sensor device 216 may assert its preference when SOC 234A is arbitrating a request from an outside component (e.g., any of SOC 234B through SOC 234N, coexistence hub device 212) that may impact the behavior of sensor device 216. In one or more embodiments, sensor device 216 may be a simple standalone device that interoperates with one or more of SOCs 234 but nevertheless have coexistence issues with other components of electronic device 100. In one or more other embodiments, sensor device 216 may be a complex sensor with embedded processors and memory that sends or receives extensive messages with one or more of the SOCs 234. It should be noted that it is not essential that sensor device 216 has its own connection to multidrop bus 220. In some embodiments, it is not possible for sensor device 216 to be directly connected to multidrop bus 220. In such cases, SOC 234A (or some other SOC) may listen for a request from sensor device 216, and, upon reception of the request, SOC 234A may coordinate with coexistence hub device 212 for performing dependent actions related to sensor device 216. For example, a transmit power of SOC 234A may impact sensor device 216, so coexistence hub device 212 may instruct a radio path on SOC 234A to be disabled, or may instruct a radio of SOC 234A to transmit at a lower power or to be temporarily disabled to accommodate operations of sensor device 216.

Fabrics 222 are communication channels enabling components in the communication system to communicate with application processor 208. One or more of fabrics 222 may be embodied as point-to-point connections such as Peripheral Component Interconnect Express (PCIe), I2C, Serial Peripheral Interface (SPI), Universal Asynchronous Receiver-Transmitter (UART) connection, or some other point-to-point connection. As illustrated in FIG. 2, SOC 234A, coexistence hub device 212 and SOCs 234B through 234N communicate with application processor 208 via corresponding fabrics 222A through 222N. One or more of fabrics 222 may have high bandwidth and low latency compared to multi-drop bus 220. Fabrics 222 illustrated in FIG. 2 may be physically separate communication channel or one or more shared physical channels with multiple logical sub-channels.

Multi-drop bus 220 is a communication channel that enables multiple components to communicate over a shared connection. Multi-drop bus 220 may be used primarily to transmit coexistence messages between components in the communication system. However, multi-drop bus 220 may also transmit other types of signals. Further, multi-drop bus 220 may be divided into more buses. In one or more embodiments, System Power Management Interface (SPMI) is used to embody multi-drop bus 220. Other serial bus interfaces such as I2C may be used instead of the SPMI to embody multi-drop bus 220.

In addition to or alternative to multi-drop bus 220, general-purpose input/output (GPIO) communication may be used between components within or external to the communication system. The GPIO connection represents a configurable direct connection between two subsystems. The GPIO may be used for various reasons, including but not limited to, (i) to support legacy devices, (ii) to provide a separate communication channel for time sensitive information, (iii) support low cost devices lacking or without processing capabilities for decoding coexistence messages, (iv) to enable communication with devices that may encounter issues communicating over a multi-drop bus due to, for example, exposure to interference, and (v) to enable dual support of GPIO communication as well as communication over multi-drop bus. As illustrated in FIG. 2, sensor device 216 may communicate with SOC 234A directly via GPIOs 228A, coexistence hub device 212 may communicate with SOC 234B directly via GPIOs 228B, and SOC 234B may communicate with SOC 234C directly via GPIOs 228C. Sensor device 216 may send low latency data to SOC 234A via GPIOs 228A while sending latency tolerant data to SOC 234A or other components via multi-drop bus 220. In an embodiment when device 216 is not a sensor device but a low cost SOC or a functional split that cannot support direct connection with multi-drop bus 220, GPIOs 228A represent direct communication means of device 216 for communicating with SOC 234A. Then, SOC 234A may utilize multidrop bus 220 to coordinate mitigations with other devices that may also be impacted by a behavior of device 216. Although not illustrated in FIG. 2, SPI, PCIe or both SPI and PCIe can also be used to provide an alternative or an additional communication mechanism. The SPI, I2C, PCIe, UART, or some other point-to-point connection (not shown in FIG. 2) can be used for low latency communications between coexistence hub device 212 and SOC 234B and/or between SOC 234B and SOC 234C.

Although not illustrated in FIG. 2, coexistence hub device 212 may also control the operations or access to one or more antennas, RF switches, or other shared/co-dependent RF components (not shown) associated with the communication system. In cases where coexistence hub device 212 controls essential RF components that another SOC (e.g., SOC 234B) depends on, GPIOs (e.g., GPIOs 228B) may be used to trigger a request for a change in state of the shared/co-dependent RF components.

Example Architecture of Coexistence Hub Device

Figure 3:
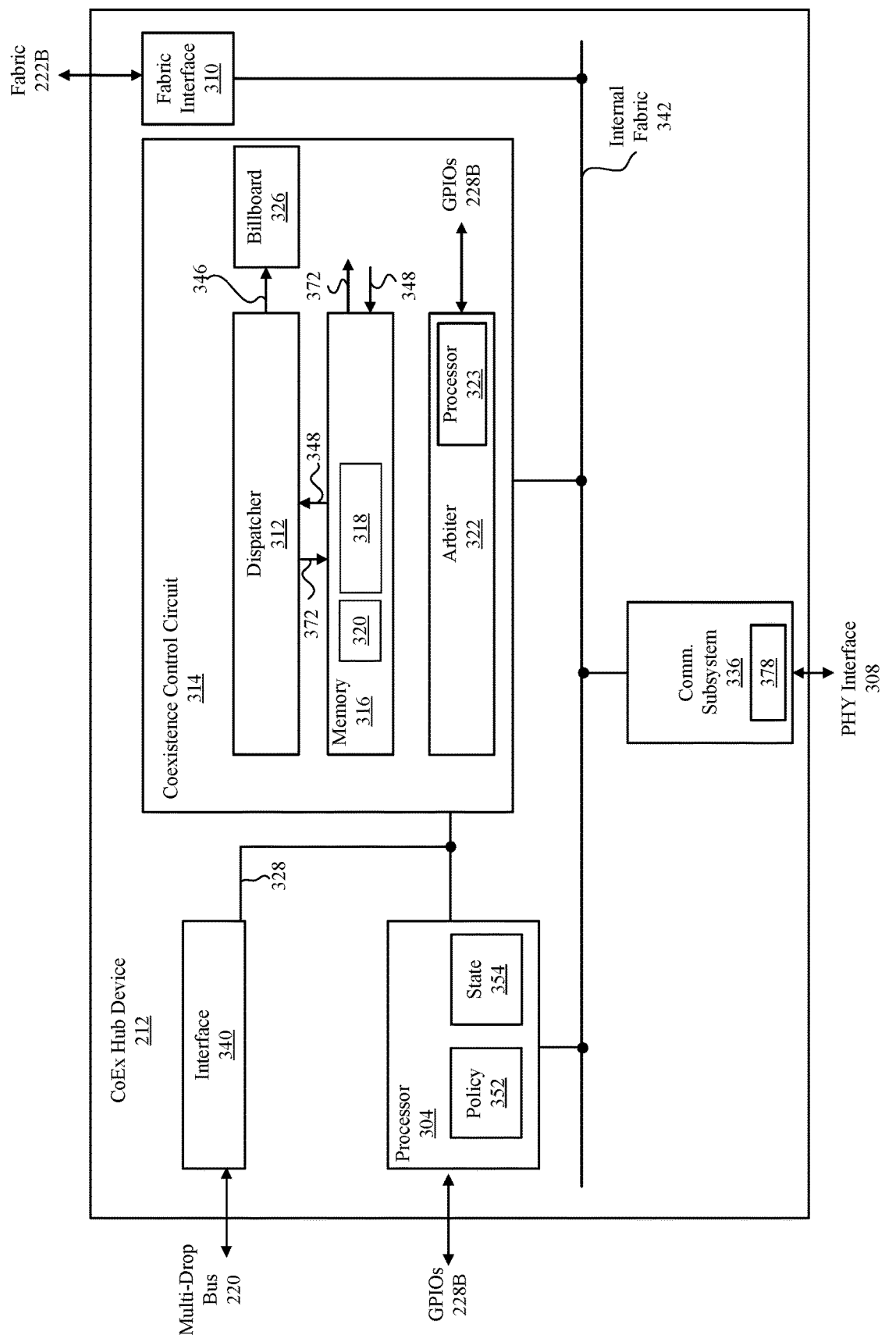
FIG. 3 is a block diagram illustrating a coexistence hub device, according to one embodiment.

FIG. 3 is a block diagram illustrating coexistence hub device 212, according to one embodiment. Coexistence hub device 212 is a part of the communication system that coordinates operations of components in the communication system that have more autonomy than other components in the communication system that depend more closely on oversight from application processor 208. Coexistence hub device 212 may also handle communication over protocols that are distinct from or partly overlap with communication performed by SOCs 234.

For this purpose, coexistence hub device 212 may include, among other components, a processor 304, a coexistence control circuit 314, a fabric interface 310, a multi-drop interface 340, a communication subsystem 336 and an internal fabric 342. Coexistence hub device 212 may include additional components not illustrated in FIG. 3 or may omit components illustrated in FIG. 3.

Processor 304 is a circuit that, by itself or in conjunction with software or firmware, controls the overall operation of coexistence hub device 212 as well as possibly coordinating operations of SOCs 234 using coexistence messages to, e.g., notify SOCs 234 about actions that processor 304 is taking or about requests for behavior changes required of SOCs 234. Processor 304 may include memory to store an operation policy 352 for controlling the operations. Operation policy 352 may be received from application processor 208 via fabric 222B, fabric interface 310, and internal fabric 342. After receiving operation policy 352, processor 304 may decode operation policy 352 and program other components in coexistence hub device 212 (e.g., coexistence control circuit 314), if applicable, to enforce operation policy 352. Furthermore, processor 304 may send a portion of operation policy 352 relevant to SOCs 234, via multi-drop bus 220, to program SOCs 234 to operate according to operation policy 352 without tightly coupled coordination with an external oversight such as application processor 208. Processor 304 may make coexistence decisions according to operation policy 352 by analyzing coexistence messages (e.g., state information or requests) received via interface 340 from SOCs 234 and communication subsystem 336. Processor 304 may store current state 354 of communication subsystem 336 in coexistence hub device 212 and one or more of SOCs 234. Processor 304 may delegate some coordination operations (e.g., coordination for communication subsystem 336) to arbiter 322 that may be a hardware component or may be implemented fully in firmware/software.

Operation policy 352 as described herein refers to scenarios of operating combinations in the communication system that may be problematic or combinations of components having interworking issues. Operation policy 352 also refers to a set of rules that define the operations to be taken by SOCs 234 and coexistence hub device 212 to resolve or cope with such problematic scenarios that also include transmit power coordination or use of the shared medium in general. Such rules may be designed to take into account various considerations, including, but not limited to, resource usage, interference in shared or overlapping communication bands, and power usage. In one or more embodiments, the rules may be stored in the form of look up tables. These look up tables may be accessed by hardware, software, firmware or combinations thereof in processor 304 to implement operation policy 352.

Processor 304 may also communicate with SOCs 234 or other components in electronic device 100 via GPIOs. Although FIG. 2 and FIG. 3 illustrate coexistence hub device 212 as communicating with SOC 234B, the GPIOs may be omitted or other additional GPIOs may be provided with communication with other components in electronic device 100.

In one embodiment, processor 304 receives the entire operation policy 352 from application processor 208 when coexistence hub device 212 is turned on at a boot time (e.g., at initialization). After that time instant, processor 304 may continue to be incrementally updated with relevant portions of operation policy 352 using of fabric 222B or a connection with application processor 208 via multi-drop bus 220. In other embodiments, processor 304 receives relevant parts of operation policy 352 from application processor 208 as communication subsystem 336 and/or SOCs 234 are turned on. In this embodiment, the turning on of communication subsystem 336 and/or SOCs 234 may be communicated to application processor 208, which causes application processor 208 to send the relevant portions of operation policy 352 to processor 304.

In another embodiment, processor 304 is pre-installed with operation policy 352. In this embodiment, processor 304 does not receive operation policy from application processor 208.

Communication subsystem 336 includes a circuit to process signals received from or for sending to physical layer (PHY) interface 308 external to coexistence hub device 212.

Although FIG. 3 shows communication subsystem 336 embedded inside coexistence hub device 212, in some embodiments communication subsystem 336 is external to coexistence hub device 212 and connected to coexistence hub device 212 via PHY interface 308. In such cases, communication subsystem 336 would continue to have access to PHY interfaces such as PHY interface 308 to control external components. Such circuit may include local processor 378 that performs one or more of the following operations: (i) executes commands associated with certain communication protocols, (ii) processes received input communication signals according to a corresponding protocol to decode the input radio signals as well as to receive communication messages from arbiter 322 or processor 304 about actions being taken by coexistence hub device 212, and to receive messages from dispatcher 312 related to relevant information pertaining to external subsystems, (iii) controls an associated RF path to adjust transmit power, receive gain control, change some critical parameter on the RF path such as decisions to enable a secondary receiver (e.g., for receive diversity) or a secondary transmitter (e.g., for uplink multiple-input multiple-output (UL MIMO) communication), or to enable a secondary RF band to support current receive operations of communication subsystem 336, and (iv) configures, disables or enables components in communication subsystem 336 based on operation policy 352 or based on information about other active components determined from dispatcher 312.

Local processor 378 of communication subsystem 336 may be initialized (e.g., by application processor 208 or automatically) when coexistence hub device 212 is turned on. Alternatively, local processor 378 can act in isolation if coexistence hub device 212 is disengaged, such as when all subsystems are not required as part of the operation of device 100. At some point in time, local processor 378 may be initialized with information on how to behave when local processor 378 receives messages about activities of external components (e.g., activities of SOC 234B). Among other things, local processor 378 is programmed with a portion of operation policy 352 relevant to the operation of communication subsystem 336. The portion of operation policy 352 downloaded to local processor 378 of communication subsystem 336 may define how communication subsystem 336 should operate (e.g., define the data rate of the communication subsystem, turning on or off of components in communication subsystem 336, and changing the number of active transmitters or receivers). Alternatively, the relevant portion of operation policy 352 may be sequentially downloaded and programmed directly by application processor 208 through fabric 222B or processor 304 as communication subsystem 336 is turned on. Communication subsystem 336 may communicate with physical layer interfaces (e.g., RF devices) via, for example, Radio Frequency Front-End Control Interface (RFFE). Communication subsystem 336 may coordinate with external subsystems to vote for preference/control of shared external components with other communication components of coexistence hub device 212 as well as with those subsystems connected to multidrop bus 220.

Interface 340 is a hardware circuit or combination of hardware circuits, software and firmware for communication with multi-drop bus 220. In one or more embodiments, interface 340 includes circuits for processing data into outbound datagrams for sending over SPMI, and unpacking inbound datagrams into data. Interface 340 is connected to processor 304 and coexistence control circuit 314 via connection 328.

Fabric interface 310 is a hardware circuit or a combination of hardware circuit, software and firmware for enabling coexistence hub device 212 to communicate with application processor 208 over fabric 222B. In one or more embodiments, fabric interface 310 performs operations such as buffering, segmenting/combining data, serializing/deserializing and packaging/unpacking of data for communication over a point-to-point communication channel (e.g., PCIe). As illustrated in FIG. 3, fabric interface 310 is connected to internal fabric 342 to enable communication of components in coexistence hub device 212 with application processor 208.

Coexistence control circuit 314 is a circuit that, by itself or in conjunction with firmware or hardware, processes coexistence messages transmitted over multi-drop bus 220. Coexistence control circuit 314 is programmed by processor 304 to enforce operation policy 352 by making real time decisions on coexistence events, distribute inbound coexistence messages to communication subsystem 336, sharing real time coexistent messages with communication subsystem 336 and sending outbound coexistence messages to SOCs 234. Coexistence hub device 212 may also send supervisory link control messages to SOCs 234. The coexistence event described herein refers to a condition or occurrence defined by operation policy 352 that would prompt coordinating of operations in components of electronic device 100.

Specifically, coexistence control circuit 314 may include, among other components, dispatcher 312, memory 316, arbiter 322, and billboard 326. Dispatcher 312 is a programmable circuit or a circuit in combination with software or firmware for filtering and sending messages for each communication subsystems 336 to memory 316.

Memory 316 has one or more buffers 318 associated with communication subsystem 336. One or more buffers 318 receive and store inbound coexistent messages (received from components outside coexistence hub device 212 via multi-drop bus 220) relevant to communication subsystem 336. The stored inbound coexistent messages in buffer 318 may be sent to communication subsystem 336 (as indicated by arrow 372) based on priority (e.g., time sensitive data has a higher priority relative to time insensitive data) via internal fabric 342. If communication subsystem 336 is inactive, one or more buffers 318 store the messages until communication subsystem 336 is turned on and become available to receive the messages. One or more buffers 318 also store outbound coexistence messages 348 (received from communication subsystem 336 via internal fabric 342). The outbound coexistence messages are retrieved by dispatcher 312 and sent out over multi-drop bus 220 to components outside coexistence hub device 212, also based on priority (e.g., time sensitive data has a higher priority relative to time insensitive data).

Memory 316 also include shared memory section 320 that may be accessed by arbiter 322 to resolve conflicting use of resources and by local processor 378 to exchange time-sensitive coexistence messages with communication subsystem 336.

Billboard 326 is a circuit that, by itself or in conjunction with software or firmware, stores state information 346 of communication subsystem 336, state information of SOCs 234, or of some essential link information of communication subsystem 336. State information 346 is received from communication subsystem 336 and stored in billboard 326 for access. Billboard 326 enables communication subsystem 336 to obtain knowledge of the state of SOCs 234 and/or for communication subsystem 336 to provide more detailed messaging for SOCs 234. Alternatively, billboard 326 enables an external component to accurately determine its operating context by accessing state information 346 in billboard 326.

Arbiter 322 is a circuit that, by itself or in conjunction with software or firmware, makes decisions on real time coordination of operation of communication subsystem 336 and sends out the decisions to the communication subsystem 336 over internal fabric 342 and memory 316. Arbiter 322 may also assist with asynchronous activity of external SOCs 234, which may impact active subsystems within coexistence hub device 212. The decisions made by arbiter 322 may include resolving competing needs of common resources by communication subsystem 336 with external components or between different communication subsystems 336 within coexistence hub device 212, or resolving requests for incompatible resources by communication subsystem 336. Arbiter 322 makes the decisions in real time, which may remain effective for a shorter time period compared to decisions made at processor 304 to implement operation policy 352. For this purpose, arbiter 322 may access current state 354 of communication subsystem 336 and SOCs 234 stored in processor 304. The algorithm for resolving the resource conflicts at arbiter 322 may be adjusted based on operation policy 352 executed by processor 304. Arbiter 322 may be programmed by processor 304 or application processor 208. The decision made by arbiter 322 may include controlling RFFE transactions associated with communication subsystem 336 to control a final agreed radio state between communication subsystems internal to coexistence hub device 212 and those communication subsystems external to coexistence hub device 212. An example of controlling the RFFE transactions is controlling of a radio switch updated based on a request from an external subsystem. Arbiter 322 may include processor 323 to control the overall operation of arbiter 322. In some embodiments, arbiter 322 may be implemented fully in firmware or software.

In one or more embodiments, arbiter 322 communicates with components external to coexistence hub device 212 via GPIOs 228B for low latency data. For example, arbiter 322 may receive sensor data from one or more of sensors 216 and make real time decisions. Arbiter 322 may be required to coordinate with internal communication subsystem 336 and an external subsystem before granting the permission to the requesting sensor device 216 (or other dependent device).

In one or more embodiments, processor 304 determines a larger scale coordination operation based on its operation policy 352, and configures components of coexistence control circuit 314, communication subsystem 336 and possibly SOCs 234 to enforce operation policy 352. Arbiter 322, on the other hand, coordinates a smaller scale, real time coexistence operations that are consistent with the larger scale coordination operation as defined by operation policy 352.

Example Architecture of SOC

Figure 4:
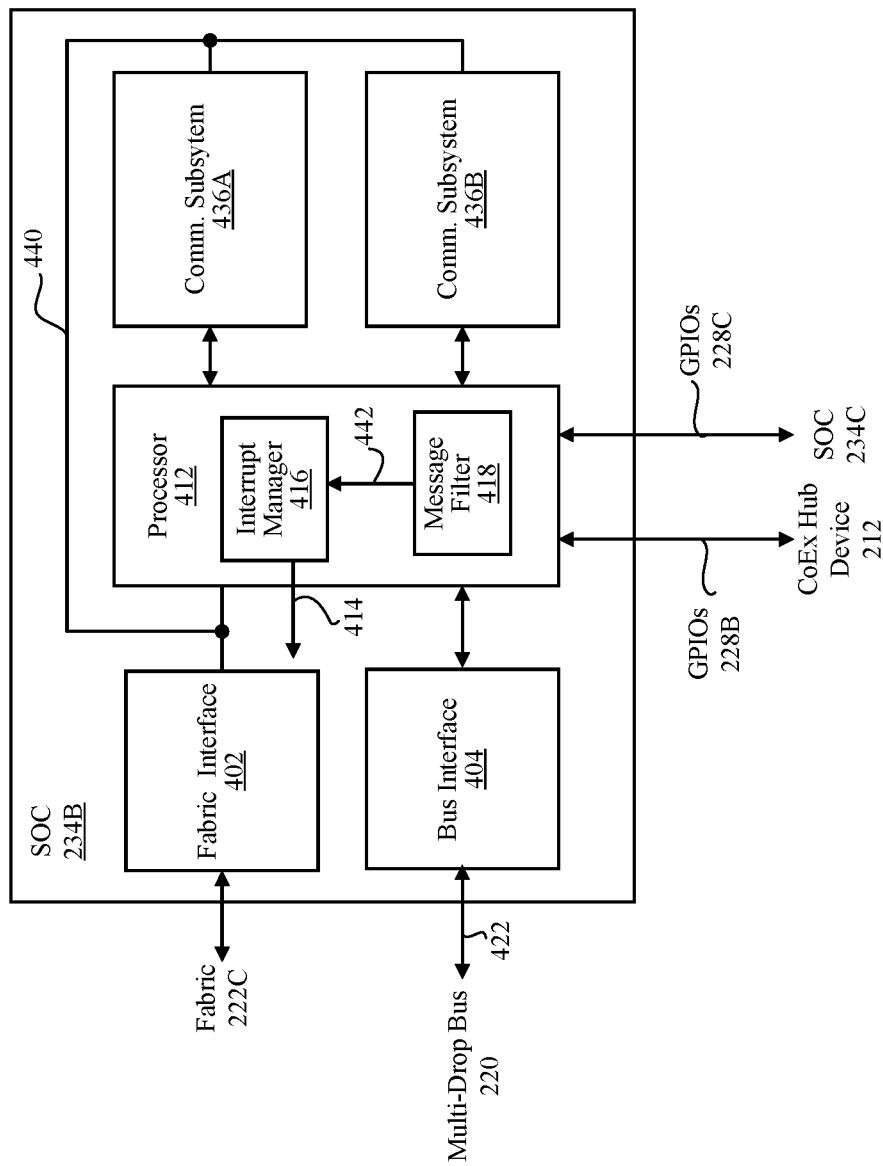
FIG. 4 is a block diagram of a system on chip (SOC), according to one embodiment.

FIG. 4 is a block diagram of SOC 234B, according to one embodiment. Although SOC 234B is illustrated in FIG. 4 as an example, other SOCs 234A, 234C through 234N may have the same or similar architecture as SOC 234B.

SOC 234B is a part of the communication system in electronic device 100 and can execute one or more communication protocols using its communication subsystems 436A, 436B (collectively referred to as "communication subsystems 436"). Although only two communication subsystems 436A, 436B are illustrated in FIG. 4, more than two communication subsystems or only a single communication subsystem may be included in SOC 234B. Communication subsystems 436A, 436B may be each associated with different communication protocols, or both may be associated with the same communication protocol. Communication subsystems 436 are substantially identical to communication subsystem 336 except that coexistence messages associated with communication subsystems 436 are processed by processor 412 instead of coexistence control circuit 314.

In some embodiments, SOC 234B is not fully autonomous and may be dependent on application processor 208 or some other component to (i) offload SOC 234B or (ii) coordinate other components essential to the behavior of SOC 234B that may be resident on application processor 208 or controlled directly by application processor 208. Thus, more than one entity (e.g., SOC 234B along with application processor 208) may be involved when a request for coexistence action comes at SOC 234B from an outside subsystem (e.g., from SOC 234C). Communication subsystems 436 can send coexistence messages over multi-drop bus 220 to coexistence hub device 212 to coexist with communication subsystems in coexistence hub device and/ or other SOCs 234A, 234C through 234N. Inbound coexistence messages to SOC 234B are processed locally by processor 412 and sent to corresponding communication subsystems 436. Other detailed explanation on communication subsystems 436 is omitted herein for the sake of brevity.

In addition to communication subsystems 436, SOC 234B may further include, among other components, fabric interface 402, bus interface 404, processor 412, and an internal bus 440 for connecting these components. SOC 234B may include further components such as memory for buffering coexistence messages associated with each communication subsystems 436.

Bus interface 404 is a circuit that, by itself or in conjunction with software or hardware, enables components of SOC 234B to communicate with coexistence hub device 212 and other SOCs 234A, 234C through 234N over multi-drop bus 220.

Fabric interface 402 is a circuit that, by itself or in conjunction with software or hardware, enables components of SOC 234B to communicate with application processor 208 over fabric 222C. The communication of fabric interface 402 is capable of transmitting data at faster speed and higher bandwidth than the communication over bus interface 404.

Processor 412 manages overall operation of SOC 234B. Processor 412 may include, among others, an interrupt manager 416 and a message filter 418 as software or hardware components for, e.g., identifying which incoming messages apply for the current operating conditions of SOC 234B.

Interrupt manager 416 is a hardware, software, firmware or a combination thereof that manages interrupts. When interrupt manager 416 receives coexistence message 442 including an interrupt, interrupt manager 416 extracts the interrupt and sends out one or more interrupt signals 414 to communication subsystem 336. Interrupt signals 414 can cause communication subsystem 336 to shut down, power down a subset of its components, wake-up from a power down mode or indicate real time state of components on multi-drop bus 220 (e.g., SOCs 234). Interrupt signals 414 may only involve a simple decoder and no microprocessor, which enables low cost components to send interrupt signals for communicating simple coexistence message over multi-drop bus 220. Interrupt signals 414 generated by processor 412 may enable SOC 234B to respond to external requests (e.g., received over GPIOs 228B and/or GPIOs 228C) even when other components of SOC 234B are in radio inactive state or deep sleep state. In such case, SOC 234B may be configured either with some agreed policy response or to wake up processor 412 to respond to the external requests over GPIOs 228B and/or GPIOs 228C.

One of the characteristics of interrupt signals 414 is that they are sticky, meaning that even if an SOC (e.g., SOC 234B) is asleep when coexistence hub device 212 sends an interrupt signal, the SOC (e.g., SOC 234B) may respond to the interrupt signal after the SOC (e.g., SOC 234B) wakes up at a later time. Interrupt signals 414 can also be used to guarantee that an external SOC (e.g., SOC 234B) may abruptly go to inactive/sleep state without requiring other components (e.g., SOC 234A) to stay awake long enough to complete handshake operations with the SOC (e.g., SOC 234B). By using always-on interrupt signals 414, the burden on the originating message source may be reduced. Sticky interrupt signals 414 with doorbell optional behavior for waking up processor 412 may enable coordination of state changes on shared radio components even when SOC 234B is in deep sleep state, thus enabling much wider flexibility for SOC 234C and coexistence hub device 212 on how SOC 234C and coexistence hub device 212 interact with SOC 234B for use of the shared radio components.

Message filter 418 is a hardware, software, firmware or a combination thereof that receives inbound coexistence messages from multi-drop bus 220 via bus interface 404, filters inbound coexistence messages 422 for relevancy before sending filtered inbound coexistence messages to communication subsystem 336, and sends filtered inbound coexistent messages to one or more buffers 318 and/or shared section 320 of memory 316. Message filter 418 may also redirect inbound coexistent messages 422 to one or more buffers (that may be organized by their priorities) associated with communication subsystem 336 to ensure that communication subsystem 336 receives all relevant inbound coexistence messages. If an inbound coexistence message includes an interrupt, message filter 418 sends the corresponding coexistence message 442 to interrupt manager 416.

Processor 412 may also communicate with other components of electronic device 100 via GPIOs. In the example of FIG. 4, processor 412 is illustrated as communicating with coexistence hub device 212 over GPIOs 228B and with SOC 234C over GPIOs 228C. But GPIOs 228B and/or GPIOs 228C may be omitted, or further GPIOs may be provided for processor 412 to communicate directly with other components of electronic device 100 to transmit time-sensitive data. GPIOs 228B and GPIOs 228C when coupled together may be used to request an action with a defined priority and/or with a defined persistence. This may enable an external device to accommodate that SOC 234B is not able to respond immediately to a received request for the action as SOC 234B may need to coordinate with one or more external devices on multi-drop bus 220 before acceding to the requesting action.

Processor 412 and/or communication subsystems 436 may be programmed by processor 304 of coexistence hub device 212 or application processor 208 to implement operation policy 352. In one embodiment, such programming may be performed when SOC 234B is initialized.

Example Block Diagram of Coordinating SOCs

Figure 5:
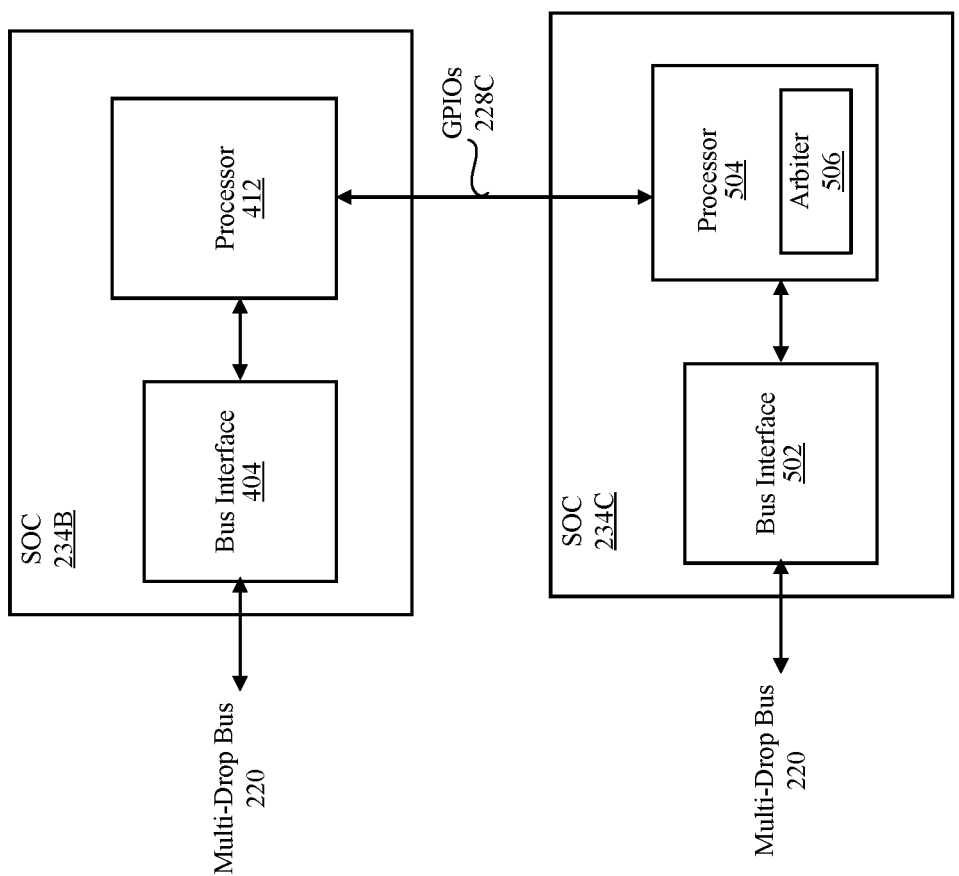
FIG. 5 is a block diagram of coordinating operations of a pair of SOCs using a multi-drop bus and configurable direct connections, according to one embodiment.

FIG. 5 is a block diagram of coordination between a pair of subsystems of electronic device 100, according to one embodiment. In the example embodiment of FIG. 5, SOC 234B coordinates activities or a dependent state of components that SOC 234B and SOC 234C individually control to allow the coordinated activities to continue, with SOC 234C over multi-drop bus 220 and GPIOs 228C. SOC 234B as shown in FIG. 5 includes bus interface 404 and processor 412 described above in conjunction with FIG. 4. SOC 234B may include additional components that are omitted herein for the sake of brevity. Similarly, SOC 234C as shown in FIG. 5 includes bus interface 502 and processor 504. Bus interface 502 operates in the same manner as bus interface 404, and processor 504 operates in the same manner as processor 412. SOC 234B is connected with SOC 234C over bus interface 404, multi-drop bus 220 and bus interface 502. The system for coordination presented herein allows for cooperation between SOC 234B and SOC 234C regardless of an individual radio state of SOC 234B and SOC 234C. Thus, SOC 234B can still act on a request from SOC 234C even if SOC 234B is otherwise in a deactivated state. Furthermore, processor 412 of SOC 234B is directly connected to processor 504 over GPIOs 228C. Alternatively, instead of multi-drop bus 220, PCIe, I2C, SPI, UART, some other point-to-point connection (not shown in FIG. 5) can be used for low latency communications and coordination of activities between SOC 234B and SOC 234C.

As shown in FIG. 5, SOC 234C further includes arbiter 506 operating in the same manner as arbiter 322 described above with reference to FIG. 3. Arbiter 506 may be part of processor 504, e.g., hardware or software component of processor 504 as shown in FIG. 5. Alternatively, arbiter 506 may be a stand-alone component, e.g., hardware or software component separate from processor 504. Arbiter 506 may be configured to communicate with all subsystems involved in decision to determine a winner device for one or more common resources and to determine an appropriate time instant at which the winner device gains control of the one or more common resources. SOC 234C in FIG. 5 can be replaced with coexistence hub device 212 to coordinate activities with SOC 234B in substantially the same manner as SOC 234C. In such case, GPIOs 238C would be replaced with GPIOs 238B, bus interface 502 would be replaced with interface 340, processor 504 would be replaced with processor 304, and arbiter 506 would be replaced with arbiter 322. In some embodiments, a functionality of arbiter 506 can at least partially reside in application processor 208. In such cases, the functionality of arbiter 506 as part of application processor 208 would principally run in the always-on domain (which is application processor 208), so that the functionality of arbiter 506 can arbitrate different SoCs concurrently based on information from other processes (e.g., performed at other SOCs) that do not always remain active.

To seek an authorization to perform an activity on SOC 234B, processor 412 may generate an authorization request and send the authorization request over bus interface 404 and multi-drop bus 220. SOC 234C may receive the authorization request from SOC 234B over multi-drop bus 220 and bus interface 502. The authorization request includes at least one of: information about parameters of the activity, information about one or more resources (e.g., medium, RF frequency, communication band, a duration of request for the use of one or more resources, etc.) of SOC 234C for usage by SOC 234B during the activity, information about a time duration of the activity, information about a persistence of the authorization request (e.g., a number of authorization request(s) previously communicated for authorizing an activity not yet authorized), information about a priority of the authorization request, information about a priority of the requested activity, or some other information relating to performance of the activity at SOC 234B.

SOC 234C may determine whether SOC 234B is authorized to execute the activity when the authorization request is received. In some embodiments, arbiter 506 determines whether SOC 234B is authorized to execute the activity. In one or more embodiments, whether SOC 234B is authorized to execute the activity may be determined by a set of rules active in arbiter 506. Such rules may be defined at least partially by operation policy 352 active in coexistence hub device 212. Arbiter 506 may also check operations currently being performed or scheduled to be performed during the requested activity and determine whether to deny the requested activity based on the current or future activities. Arbiter 506 (e.g., in combination with one or more software processes running on processor 504 and/or application processor 208) may also ensure that external critical dependencies (e.g., RF filters) of SOC 234B are in appropriate states so that SOC 234B and SOC 234C are in compatible states with each other and that their activities can be coordinated within a defined time limit. In one or more embodiments, SOC 234B may be also authorized to execute the activity on behalf of SOC 234C.

In some other embodiments, after receiving the authorization request from SOC 234B over multi-drop bus 220 and bus interface 502, processor 504 may initiate an interrupt service routine (ISR). The ISR running on processor 504 represents a software-based arbiter that generates an appropriate response signal for SOC 234B, e.g., based on operation policy 352 active in coexistence hub device 212. In an embodiment, the ISR may generate an authorization signal for SOC 234B authorizing the requested activity at SOC 234B. In another embodiment, the ISR may generate a denial signal for SOC 234B denying access by SOC 234B to resource(s) for the requested activity. In yet another embodiment, the ISR may generate a coordination signal for coordinating activities between SOC 234B and SOC 234C that are different from authorization/denial of an activity, e.g., setting external components (e.g., RF filters) of SOC 234B and/or SOC 234C in compatible states ensuring that SOC 234B and SOC 234C can mutually cooperate, exchange information about an exact time of at which a change of state of component(s) or a scheduled activity will occur, or perform some other coordination.

Processor 504 of SOC 234C may send the response signal (e.g., the authorization signal, denial signal, or coordination signal) over GPIOs 228C to processor 412 of SOC 234B. In one embodiment, processor 504 of SOC 234C sends the authorization signal over GPIOs 228C to processor 412 authorizing SOC 234B to execute the requested activity after determining (e.g., by arbiter 506 or via the ISR) that SOC 234B is authorized to execute the requested activity. The communication over GPIOs 228C has a lower latency compared to the communication over multi-drop bus 220, and hence, sending the authorization signal using GPIOs 228C enables SOCs 234B, 234C to coordinate time-sensitive operations associated with using the resources. Based on the authorization signal received from SOC 234C over GPIOs 228C, SOC 234B may perform the activity using the one or more resources of SOC 234C, e.g., for a time period less than a threshold time period. In another embodiment, processor 504 of SOC 234C sends the denial signal over GPIOs 228C to processor 412 denying resource(s) to SOC 234B for execution of the requested activity after determining (e.g., by arbiter 506 or via the ISR) that SOC 234B is not authorized to execute the requested activity.

In yet another embodiment, processor 504 of SOC 234C may exchange one or more coordination signals over GPIOs 228C with processor 412 for coordination of activities between SOC 234B and SOC 234C other than authorization/denial of an activity. The one or more coordination signals sent over GPIOs 228C may allow different layers or parts of the communication between SOC 234B and SOC 234C to be transmitted over GPIOs 228C and multi-drop bus 220. For example, non-time sensitive signals between SOC 234B and SOC 234C can be sent over multi-drop bus 220, whereas time sensitive signals can be communicated over GPIOs 228C.

In some embodiments, processor 504 of SOC 234C receives the authorization request via bus interface 502 and multi-drop bus 220 with a first latency less than a first time limit, after processor 412 of SOC 234B sends the authorization request via bus interface 404 and multi-drop bus 220. After receiving the authorization request, processor 504 may also send the authorization signal (or denial signal) over GPIOs 228C with a second latency less than a second time limit. The second time limit may be shorter than the first time limit. Processor 504 may send the authorization signal over GPIOs 228C according to a local timing of processor 504, which means that processor 504 may enqueue transactions for communication over GPIOs 228C either immediately upon reception of the authorization request or within a defined time period after receiving the authorization request using an internal timer of processor 504. Processor 504 may process the received authorization request within a defined time limit after receiving the authorization request.

Processor 504 may send over GPIOs 228C a request for SOC 234B to release one or more resources (e.g., medium, communication band, RF antenna, etc.) being used during the activity of SOC 234B. In one or more embodiments, processor 504 or processor 412 may send over GPIOs 228C a coordination signal to the other subsystem (e.g., to SOC 234B or to SOC 234C) for coordination of resources between SOC 234B or SOC 234C (e.g., setting RF filters of SOC 234B and/or SOC 234C in appropriate states, or restricting the use of a RF antenna by one subsystem) so that the two subsystems are compatible and can coordinate activities with each other. In one or more other embodiments, GPIOs 228C can be used to signal critical blocking activity between SOC 234B and SOC 234C as a coordination operation between the two subsystems. In such cases, a blocking signal may be sent over GPIOs 228C to indicate that a task from a pre-agreed set of permitted tasks is about to be performed, e.g., at SOC 234B. Based on the critical blocking activity previously signaled over GPIOs 228C, SOC 234C may relinquish the use of one or more resources within a defined time limit. Then, SOC 234C may send the authorization signal over GPIOs 228C to allow SOC 234B to take over the one or more resources and perform a critical task of SOC 234B.

Processor 504 may also monitor a status of at least one resource of SOC 234C during the activity of SOC 234B. During the activity of SOC 234B, processor 504 may receive another authorization request from SOC 234B over multi-drop bus 220 and bus interface 502. The other authorization request may seek authorization to perform another activity at SOC 234B using the at least one resource of SOC 234C. Based on the monitored status of the at least one resource, processor 504 may generate (e.g., via arbiter 506) an appropriate response signal for SOC 234B, e.g., an authorization signal or denial signal. Processor 504 may send the appropriate response signal (e.g., authorization signal or denial signal) to processor 412 over GPIOs 228C. The response signal may be time delayed accounting for one or more current actions on the at least one resource (e.g., one or more shared radio components) of SOC 234B to be completed according to, e.g., a network protocol before SOC 234B can permit SOC 234C to take over the at least one resource.

In accordance with embodiments of the present disclosure, SOC 234B and SOC 234C are dynamically connected via multi-drop bus 220 and GPIOs 228C such that both SOC 234B and SOC 234C can exchange messages over multi-drop bus 220 and GPIOs 228C to coordinate with each other. The coordination is not limited to authorization and denial of an activity at one of SOC 234B and SOC 234C. GPIOs 228C may also be used for other coordination of activities in SOC 234B and SOC 234C where external components of SOC 234B and SOC 234C (e.g., filters of RF front-ends) are set to be in a known/compatible state, e.g., based on one or more messages exchanged over GPIOs 228C. GPIOs 228C thus represent a mechanism to guarantee one subsystem to control the state of the front-end of the other subsystem for coordinated operations of the two subsystems (e.g., SOC 234B and SOC 234C). GPIOs 228C (alone or together with multi-drop bus 220) can be used for real time signaling to control codependent resources of multiple subsystems (e.g., SOC 234B and SOC 234C) such that one subsystem (e.g., SOC 234B) may directly control one or more dependent resources on another subsystem (e.g., SOC 234C) causing the one or more dependent resources to be in a compatible state.

Alternatively or additionally, GPIOs 228C may be utilized to control an activity on a corresponding subsystem (e.g., SOC 234B), such as blanking a transmitter path, changing a transmit antenna in use on the corresponding subsystem, controlling one or more front-end components of the corresponding subsystem, controlling a critical state of the corresponding subsystem, permitting activity to occur on the other subsystem, or some other coordination. SOC 234C can send, in real-time over GPIOs 228C, an indication signal to SOC 234B indicating that SOC 234B is now authorized to actively reuse the requested resource(s) (e.g., medium, communication band, etc.). Also, SOC 234C can send over GPIOs 228C a blocking signal to SOC 234B to block SOC 234B from performing any task having a priority less than a threshold priority, so that only tasks that are pre-defined to have priorities higher than the threshold priority are permitted for execution at SOC 234B (e.g., any task related to preservation of a communication link between SOC 234B and SOC 234C). Furthermore, responsive to an activity at SOC 234B being denied a predetermined number of times by SOC 234C, SOC 234C can send an authorization signal over GPIOs 228C finally authorizing SOC 234B to perform the activity.

In some embodiments, GPIOs 228C can be utilized for sending one or more messages between SOC 234B and SOC 234C ahead of time to coordinate operations of SOC 234B and SOC 234C. GPIOs 228C may convey, within the one or more messages, an exact time instant at which the change and/or action is to take place on the other subsystem. Thus, signals send over GPIOs 228C represent the critical "action trigger" that causes SOC 234B and/or SOC 234C to take certain actions. GPIOs 228C can be especially valuable for subsystems where coexistence messaging over multi-drop bus 220 is performed by different parts of the software run at e.g., processor 412 of SOC 234B and/or processor 504 of SOC 234C such that processors 412 and/or processor 504 may not have the context for the exact timing governed by a lower level of the physical layer. In such cases, GPIOs 228C facilitate coordination communication between SOC 234B and SOC 234C by conveying coexistence messages between SOC 234B and SOC 234C.

In some embodiments, coexistence hub device 212 may send a request to e.g., SOC 234B over GPIOs 228B for timing information that would indicate a time when one or more resources (e.g., medium, frequency band, etc.) become available to be released by SOC 234B to one or more other subsystems. In response to the request, SOC 234B may send a response to coexistence hub device 212 over GPIOs 228B informing coexistence hub device 212 about the time when SOC 234B can release the one or more resources. Coexistence hub device 212 may request SOC 234B (via the request sent over GPIOs 228B) to send the response asynchronously over GPIOs 228B to indicate that SOC 234B is to release its resources.

Electronic device 100 with multi-drop bus 220 may include some components (e.g., SOC 234B and/or SOC 234C) where, due to legacy design, these components may not support a communication protocol over multi-drop bus 220. Embodiments of the present disclosure support low cost external components (e.g., SOC 234B and/or SOC 234C) with only GPIO connections that can be incorporated into electronic device 100 with multi-drop bus 220. These external components (e.g., SOC 234B and/or SOC 234C) may utilize arbiter 322 of coexistence hub device 212 or its own arbiter (e.g., arbiter 506 of SOC 234C) to observe the GPIO connections (e.g., GPIOs 228C), so that a corresponding external component (e.g., SOC 234C) can coexist with another external component (e.g., SOC 234B), where, e.g., SOC 234B and SOC 234C are the most exposed among all subsystems of electronic device 100 in terms of shared or mutually incompatible use of one or more resources (e.g., frequency band, medium, etc.). The GPIO connections (e.g., GPIOs 228C) may allow lower cost subsystems (e.g., SOC 234B and/or SOC 234C) to cooperate and function along with more sophisticated subsystems (e.g., coexistence hub device 212 and/or SOC 234A) of electronic device 100.

In one or more embodiments, SOC 234B proceeds with assumed authorization for executing a requested activity. In such cases, SOC 234B may simply notify SOC 234C (e.g., over GPIOs 228C) of an intended action of the SOC 234B assuming an implied response by SOC 234C. In one or more other embodiments, SOC 234B sends, to SOC 234C over multi-drop bus 220 or GPIOs 228C, an authorization request seeking authorization for execution of an activity, and SOC 234B may rely on SOC 234C to complete the activity if conditions permit.

Example Processes of Coordinating Coexistence Operations

Figure 6:
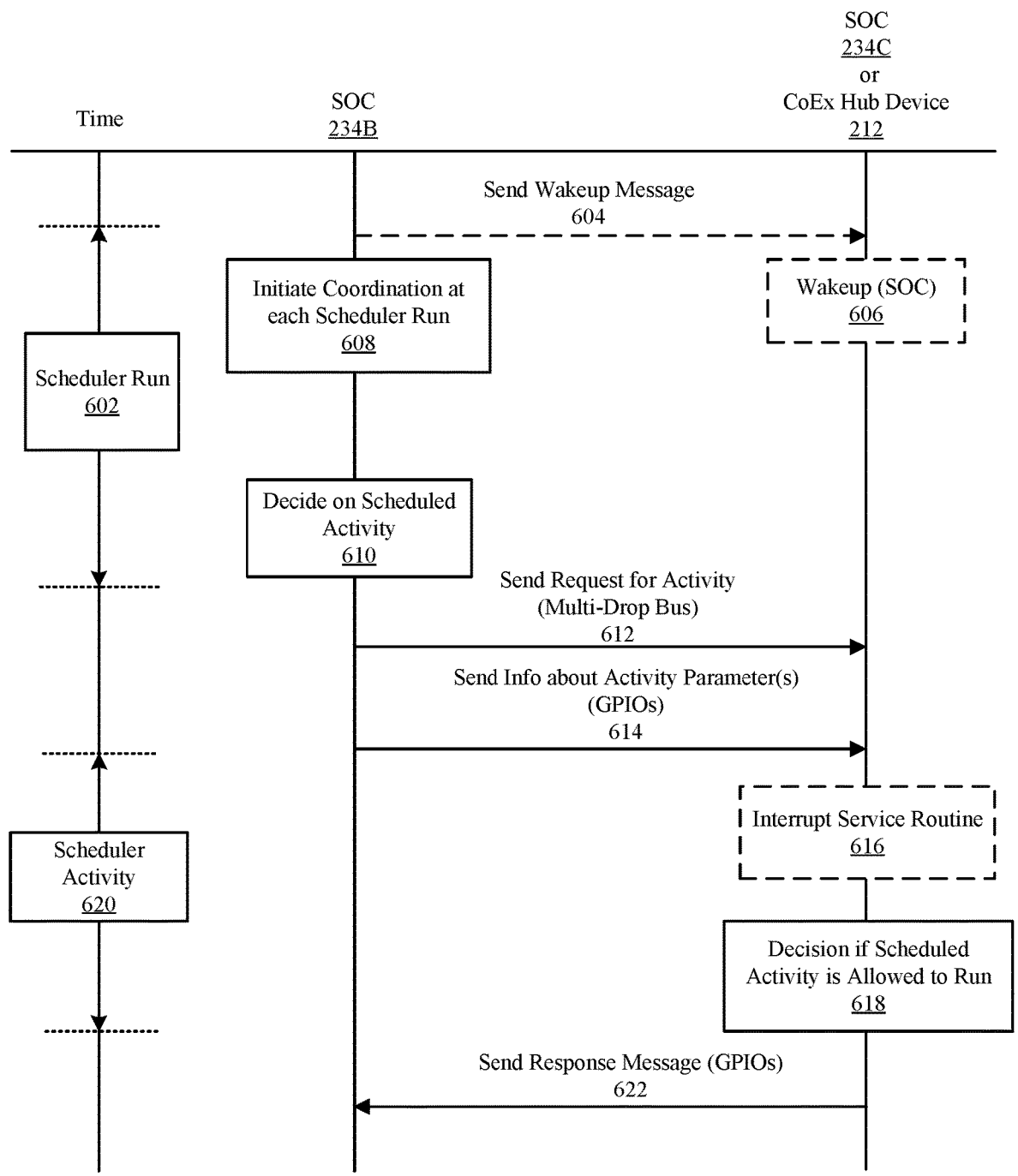
FIG. 6 is an interaction diagram illustrating operations and interactions of components in the electronic device, according to one embodiment.

FIG. 6 is an interaction diagram illustrating operations and interactions of components in electronic device 100, according to one embodiment. The interaction diagram in FIG. 6 illustrates an example of coordination operations between a pair of components of electronic device 100, such as a coordination between SOC 234B and SOC 234C (or coexistence hub device 212).

During a time period of scheduler run 602 of SOC 234B, SOC 234B may send 604 a wakeup message (e.g., over multi-drop bus 220) to SOC 234C. After receiving the wakeup message, SOC 234C may wake up 606 and turn on its component devices or a subset thereof. During each scheduler run 602, SOC 234B may initiate 608 coordination with another component of electronic device 100 (e.g., SOC 234C or coexistence hub device 212).

During the same scheduler run 602, SOC 234B may decide 610 whether a scheduled activity of SOC 234B should be performed. If SOC 234B decides 610 to perform the scheduled activity, SOC 234B may send 612, over multi-drop bus 220 to SOC 234C (or to coexistence hub device 212), a request for performing the scheduled activity, e.g., once it is determined that wake up 606 is complete. The request may include one or more information about activity parameters, e.g., information about one or more resources of SOC 234C or coexistence hub device 212 requested to be released for usage during the scheduled activity of SOC 234B. The activity parameters sent as part of the request may be written to a shared memory of SOC 234C or coexistence hub device 212 (e.g., shared memory section 320). SOC 234C (or coexistence hub device 212) may receive the request over multi-drop bus 220 within a first time limit after SOC 234B sends the request. SOC 234B may further send 614, via GPIOs 228C, information about the activity parameters to SOC 234C or coexistence hub device 212. In an embodiment, SOC 234B may send 614 an indication to SOC 234C (or coexistence hub device 212) that a RF front-end of SOC 234C is set as active in preparation for the scheduled activity at SOC 234C.

In one embodiment, upon reception of the request for performing the scheduled activity at SOC 234B, SOC 234C (or coexistence hub device 212) initiates 616 an ISR that may run on processor 508 of SOC 234C (or processor 304 of coexistence hub device 212). During the ISR, SOC 234C (or coexistence hub device 212) may decide whether or not to authorize the scheduled activity at SOC 234B, and SOC 234C (or coexistence hub device 212) generates an appropriate response message for SOC 234B. In another embodiment, upon reception of the request for performing the scheduled activity at SOC 234B, arbiter 510 of SOC 234C (or arbiter 322 of coexistence hub device 212) executes an operation policy received from application processor 208 and decides 618 whether SOC 234B is authorized to run the scheduled activity. SOC 234C (or coexistence hub device 212) decides 618 whether SOC 234B is authorized to run the scheduled activity during scheduler activity 620 (e.g., WiFi scheduler activity) of SOC 234C (or coexistence hub device 212). After the decision 618 whether SOC 234B is authorized to run the scheduled activity is made, SOC 234C (or coexistence hub device 212) sends 622 a response message to SOC 234B over GPIOs 228C (or GPIOs 228B). In an embodiment, the response message includes an authorization signal authorizing SOC 234B to execute the scheduled activity. In another embodiment, the response message includes a denial message indicating to SOC 234B that the scheduled activity is not authorized and that the requested resource(s) cannot be released to SOC 234B. The denial message may further include a "shutdown signal" instructing SOC 234B to turn off any resource (e.g., RF front-end) activated in advance of a start of the scheduled activity. SOC 234C (or coexistence hub device 212) sends 622 the response message over GPIOs 228C (or GPIOs 228B) within a second time limit (e.g., shorter than the first time limit) after receiving the request for authorizing the scheduled activity at SOC 234B.

Figure 7:
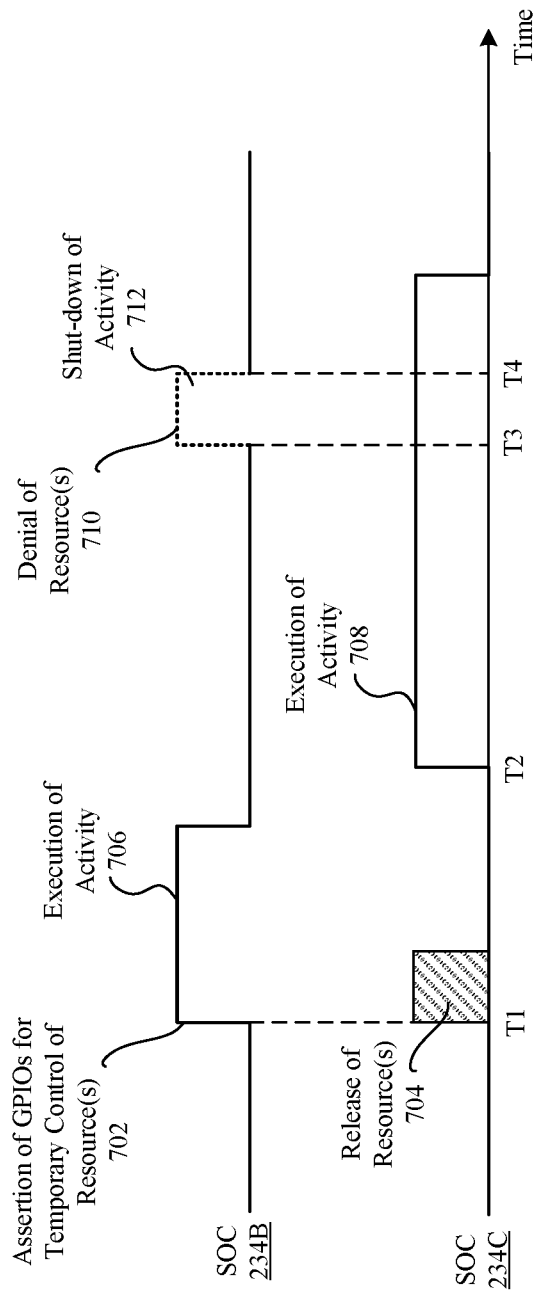
FIG. 7 is a timing diagram illustrating coordination of components in the electronic device, according to one embodiment.

FIG. 7 is a timing diagram illustrating coordination of components in electronic device 100 over a shared bus, according to one embodiment. In the embodiment shown in FIG. 7, SOC 234B and SOC 234C may coordinate their activities over the shared bus, e.g., multi-drop bus 220 coupled with GPIOs 228C. Alternatively, instead of using multi-drop bus 220, SOC 234B and SOC 234C may coordinate their activities over a point-to-point connection and GPIOs 228C. Before time instant T1, SOC 234B may send a request for one or more resources (e.g., a communication band, medium, etc.) to SOC 234C over, e.g., multi-drop bus 220 or GPIOs 228C. At time instant T1, SOC 234B asserts 702 GPIOs 228C and gains temporary control of the one or more resources from SOC 234C. The assertion 702 represents an authorization for temporary usage of the one or more resources by the SOC 234B. Upon observing the assertion 702, SOC 234C releases 704 the one or more resources that were requested by SOC 234B. For example, SOC 234C may disable its own RF paths, change its radio antennas in use, or change its transmit power within a defined time period to permit SOC 234B to commence one or more activities. Note that if SOC 234C has a scheduled activity with a priority higher than a threshold priority, SOC 234C can assert GPIOs 228C (e.g., at time instant T2) and SOC 234B would permit SOC 234C to take over the previously released (or disabled) resource (e.g., enabling RF paths of SOC 234C) required for performing the scheduled activity.

SOC 234B executes 706 the requested activity at least using the one or more resources released by SOC 234C. SOC 234B may initiate the requested activity at time instant T1 based on information that an implied authorization time for usage of the one or more resources at SOC 234C has expired. The implied behavior is that SOC 234B can always obtain the one or more resources based on an implicit priority. However, SOC 234C can assert its own needs (e.g., via GPIOs 228C) for a predefined set of tasks and get back at least some of the resources previously released to SOC 234B. Alternatively, SOC 234B may initiate the requested activity by sending, over multi-drop bus 220 at time instant T1, a signal indicating a high priority context for the activity, which can be coupled with transmission of another signal over GPIOs 228C to SOC 234C with information about a time instant when an action of releasing the resources by SOC 234C needs to occur.

At time instant T2, SOC 234C initiates 708 an execution of its own activity using available resources. Alternatively, SOC 234B and SOC 234C can communicate over multi-drop bus 220 to negotiate in advance the real time of the activity of SOC 234C given a priority of the activity. Then, SOC 234B and SOC 234C can dynamically coordinate better coupling for the real-time coordination by utilizing GPIOs 228C. At time instant T3, SOC 234B sends, e.g., over multi-drop bus 220 or one of GPIOs 228C, another request for at least one resource (e.g., a communication band) for another activity that would be performed by SOC 234B. However, because SOC 234C is executing the activity with a priority higher than that of the other activity (e.g., execution of a critical function at SOC 234C), the request for the other activity is ignored or denied by SOC 234C. Upon reception of the other request, SOC 234C sends 710 over multi-drop bus 220 a signal indicating denial of resource(s) for the other activity. Alternatively, the denial of the other activity at SOC 234B is implied when GPIOs 228C are utilized for coordination of activities between SOC 234B and SOC 234C, where there are predefined rules and expectations of how SOC 234B and SOC 234C react to different signal transitions on GPIOs 228C.

SOC 234C may generate the denial signal (e.g., via arbiter 510) based on determining that a priority of the activity currently being executed by SOC 234C that uses the at least one requested resource has a priority higher than a priority of the other activity requested to be performed by SOC 234B. SOC 234B may initiate the other activity (e.g., by activating its own resource(s) for the other activity, such as activation of the RF front-end) even before receiving any response from SOC 234C, e.g., at time instant T3. However, upon reception 710 of the denial signal via multi-drop bus 220, SOC 234B may shut down (e.g., deactivate) 712 any resource(s) associated with the ignored/denied activity, thus effectively terminating the ignored/denied activity at time instant T4.

Figure 8A:
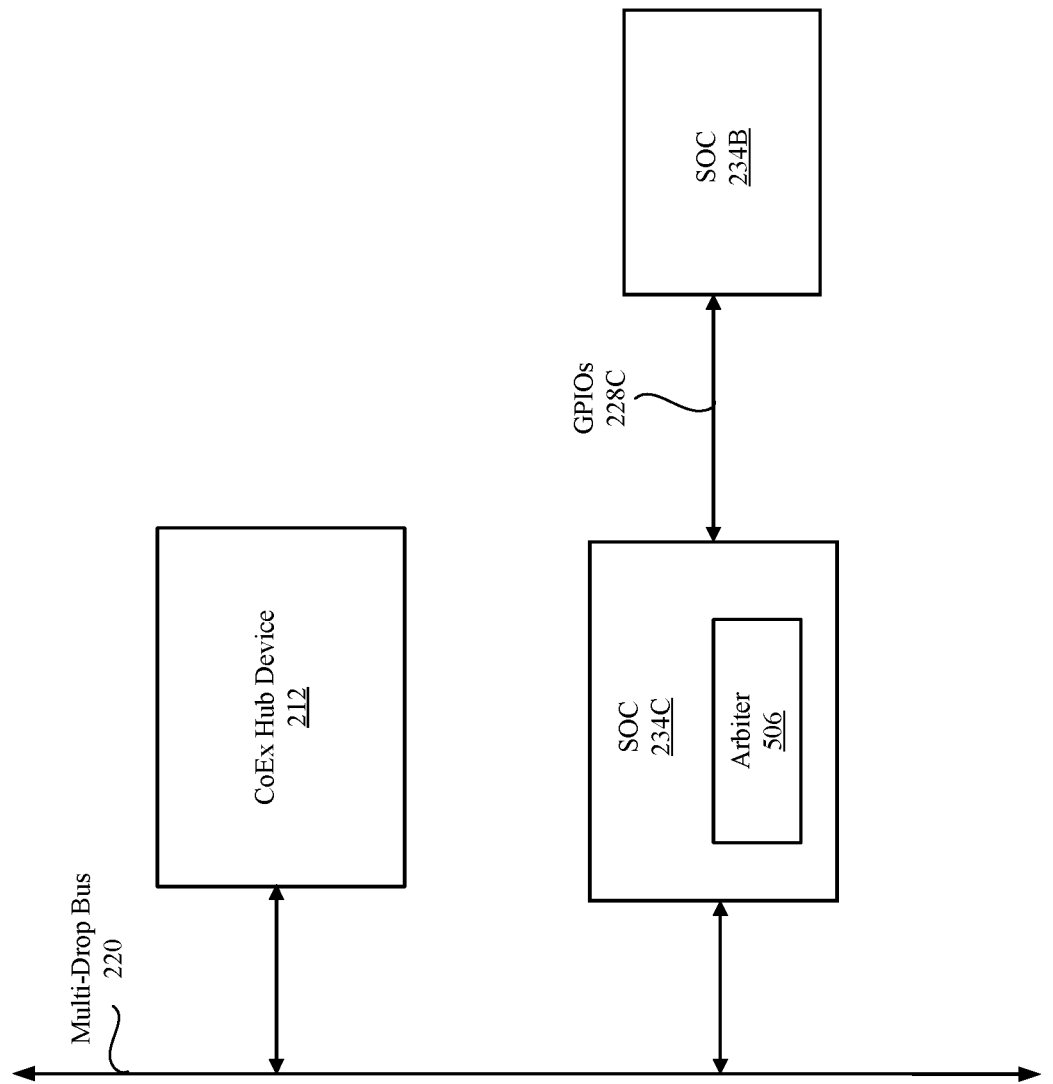
FIG. 8A is a block diagram of coordinating operations of a pair of SOCs for accessing a resource using a multi-drop bus and configurable direct connections, according to one embodiment.

FIG. 8A is a block diagram of coordination between a pair of subsystems of electronic device 100, according to one embodiment. In the example embodiment of FIG. 8A, SOC 234C coordinates, with coexistence hub device 212 over multi-drop bus 220, granting (or denying) an access to a resource (e.g., a medium) to SOC 234B. It should be noted that in this example embodiment SOC 234B is directly coupled to SOC 234C via GPIOs 228C, and SOC 234B does not have any direct connection to multi-drop bus 220. Thus, SOC 234B is codependent on SOC 234C for an access to the resource. The ability of SOC 234C to grant access to the resource to SOC 234B may require coordination with e.g., coexistence hub device 212 over multi-drop bus 220.

Figure 8B:
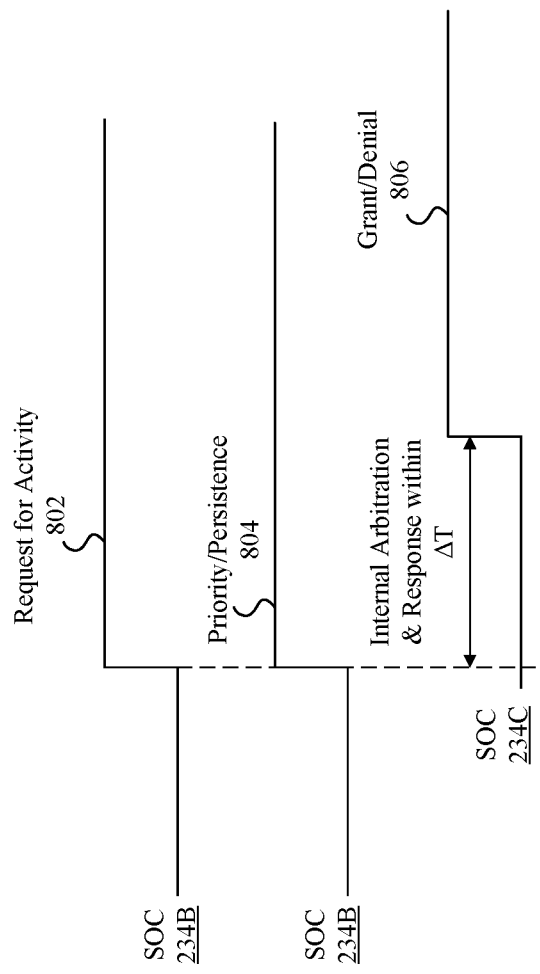
FIG. 8B is a timing diagram illustrating coordination of components from FIG. 8A, according to one embodiment.

FIG. 8B is a timing diagram illustrating coordination of components from FIG. 8A, according to one embodiment. At some point in time, SOC 234B may send 802, over GPIOs 228C (e.g., over one of GPIOs 228C), a request for activity to SOC 234C seeking authorization from SOC 234C to obtain access to the resource for performing the requested activity. Simultaneously or near simultaneously with sending 802 the request for activity, SOC 234B may send 804 a priority signal/persistence signal over GPIOs 228C to SOC 234C in relation to the requested activity. In an embodiment, the priority signal and the persistence signal are sent from SOC 234B to SOC 234C as a single signal over, e.g., one of GPIOs 228C. In another embodiment, the priority signal and the persistence signal are sent from SOC 234B to SOC 234C as two separate signals over, e.g., a pair of GPIOs 228C. After internal arbitration performed by, e.g., arbiter 506 of SOC 234C, SOC 234C may generate an appropriate response for SOC 234B. The internal arbitration and generation of response may be performed within a time $\Delta T$ (e.g., $\Delta T \leq 30$ μs). After the time $\Delta T$, SOC 234C may send 806 a grant/denial to SOC 234B over GPIOs 228C to grant or deny to SOC 234B access to the requested resource. This is typical if SOC 234C can autonomously decide on the request by SOC 234B to grant access to the requested resource (e.g., medium).

In one or more embodiments, SOC 234C may deny 806 access to the resource, e.g., if coexistence hub device 212 informs SOC 234C over multi-drop bus 220 that coexistence hub device 212 currently uses (or intends to use with a defined time period) the resource requested by SOC 234B. In the case when SOC 234C sends 806 the denial response to SOC 234B, the request for activity and the priority/persistence signals may not be any more asserted on GPIOs 228C, and assertion of the request for activity and the priority/persistence signals on GPIOs 228C may need to be repeated after a defined time period. In one or more other embodiments, SOC 234C may grant 806 access to the resource, e.g., if coexistence hub device 212 informs SOC 234C over multi-drop bus 220 that coexistence hub device 212 is not currently using (or does not intend to use with a define time period) the resource requested by SOC 234B.

Figure 9A:
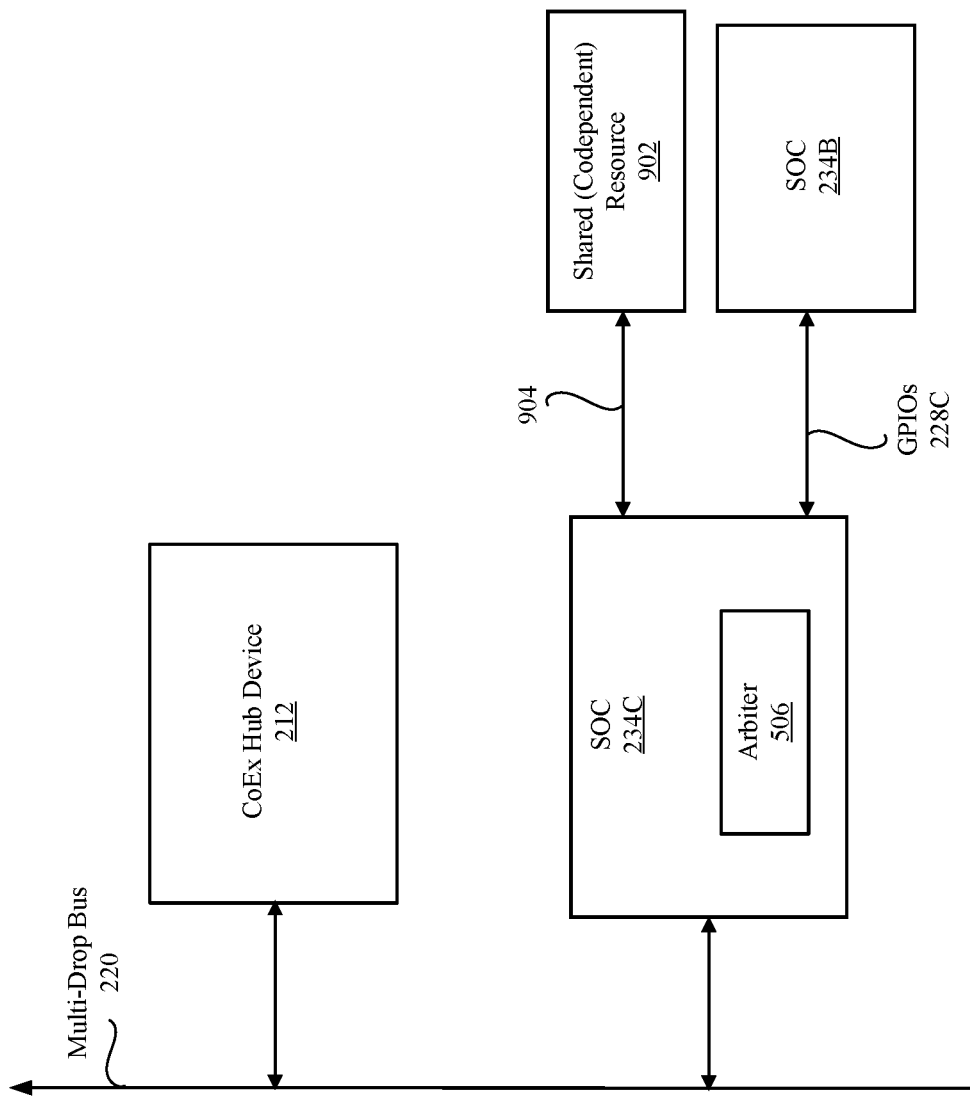
FIG. 9A is a block diagram of coordinating operations of a pair of SOCs for accessing a shared (codependent) resource using a multi-drop bus and configurable direct connections, according to one embodiment.

FIG. 9A is another block diagram of coordination between a pair of subsystems of electronic device 100, according to one embodiment. In the example embodiment of FIG. 9A, SOC 234C coordinates, with coexistence hub device 212 over multi-drop bus 220, grant of an access to at least one shared (or codependent) resource 902 to SOC 234B. At least one shared resource 902 may be coupled to SOC 234C over a connection 904. It should be noted that in this example embodiment SOC 234B is directly coupled to SOC 234C via GPIOs 228C, SOC 234B does not have any direct connection to multi-drop bus 220, and at least one resource 902 may be shared (codependent) between SOC 234C and SOC 234B. SOC 234B may typically operate independently of SOC 234C. However, for granting the access to at least one shared (codependent) resource 902 (e.g., one or more RF bands), cooperation between SOC 234C and coexistence hub device 212 over multi-drop bus 220 for control of at least one shared resource 902 may be critical. Coexistence hub device 212 may be also codependent on at least one shared resource 902. Arbiter 506 of SOC 234C may be configured to listen to inputs from coexistence hub device 212, SOC 234B and SOC 234C to decide which one is in a preferred state for accessing at least one shared resource 902.

Figure 9B:
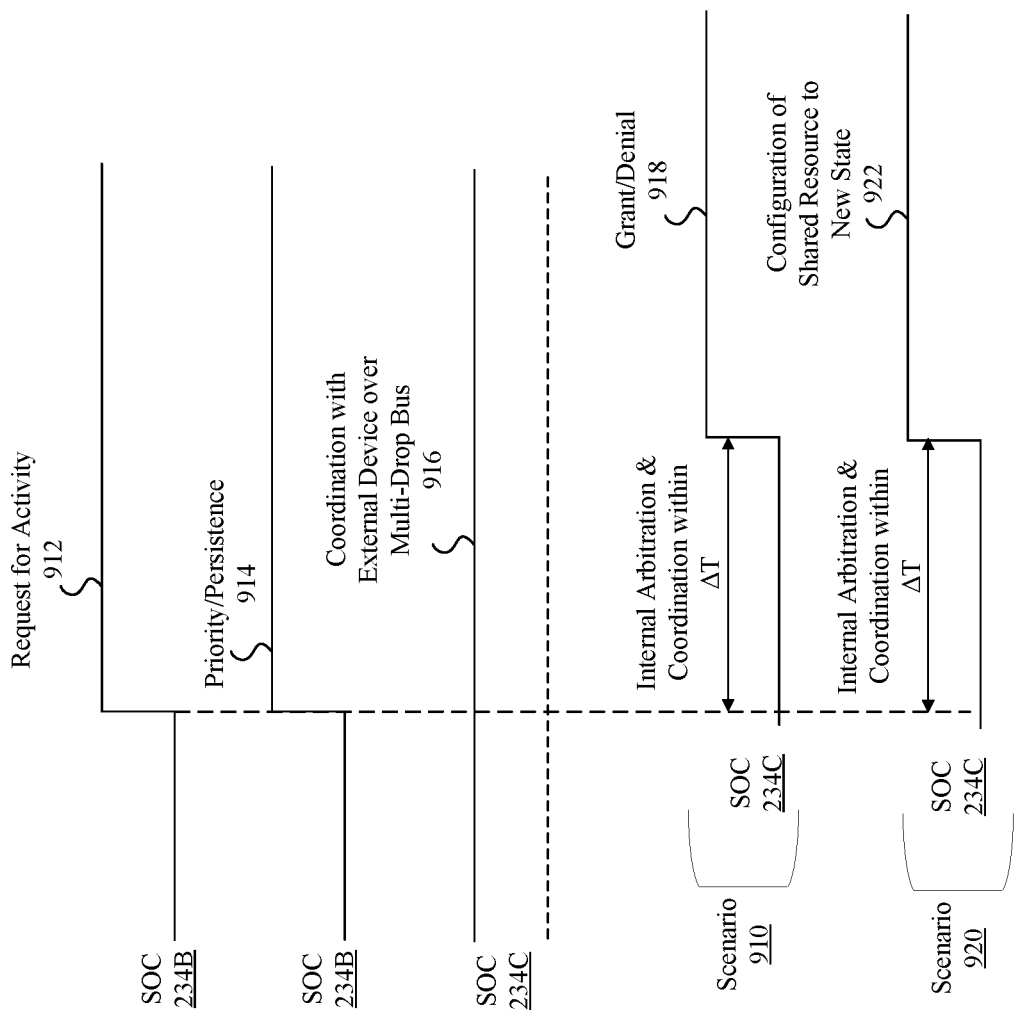
FIG. 9B is a timing diagram illustrating coordination of components from FIG. 9A, according to one embodiment.

FIG. 9B is a timing diagram illustrating coordination of components from FIG. 9A, according to one embodiment. At some point in time, SOC 234B may send 912 a request for activity over GPIOs 228C (e.g., over one of GPIOs 228C) to SOC 234C seeking authorization from SOC 234C to obtain access to the at least shared resource 902 for performing the requested activity. Simultaneously or near simultaneously with sending 912 the request for activity, SOC 234B may send 914 a priority signal/persistence signal over GPIOs 228C to SOC 234C in relation to the requested activity. In an embodiment, the priority signal and the persistence signal are sent from SOC 234B to SOC 234C as a single signal over, e.g., one of GPIOs 228C. In another embodiment, the priority signal and the persistence signal are sent from SOC 234B to SOC 234C as two separate signals over, e.g., a pair of GPIOs 228C. In the same time, SOC 234C may perform coordination 916 with an external device (e.g., coexistence hub device 212) over multi-drop bus 220 for access to at least one shared resource 902.

In scenario 910, after internal arbitration performed by, e.g., arbiter 506 of SOC 234C and coordination with coexistence hub device 212 over multi-drop bus 220, SOC 234C may generate an appropriate response for SOC 234B. The internal arbitration along with at least a portion of external coordination and generation of response may be performed within a time $\Delta T$ (e.g., $\Delta T \geq 50$ μs). After the time $\Delta T$, SOC 234C may send 918, over GPIOs 228C, a grant/denial to SOC 234B to grant or deny to SOC 234B access to at least one shared resource 902. In one or more embodiments, SOC 234C may deny 918 access to at least one shared resource 902, e.g., if, through coordination with coexistence hub device 212, arbiter 506 is aware that coexistence hub device 212 currently uses (or intends to use with a define time period) at least one shared resource 902. In one or more other embodiments, SOC 234C may grant 918 to SOC 234B access to at least one shared resource 902, e.g., if, through coordination with coexistence hub device 212, arbiter 506 is aware that coexistence hub device 212 is not currently using (or does not intend to use with a define time period) at least one shared resource 902.

Alternatively, in scenario 920, after internal arbitration performed by, e.g., arbiter 506 of SOC 234C and external coordination with coexistence hub device 212 over multi-drop bus 220, SOC 234C may perform 922 configuration of at least one shared resource 902 to a new state. The internal arbitration along with at least a portion of external coordination may be performed within a time $\Delta T$ (e.g., $\Delta T \geq 50$ μs). The new state of at least one shared resource 902 may correspond a state of at least one shared resource 902 being preferred for the activity requested by SOC 234B. Once the configuration to the new state is finished, SOC 234B may be allowed to access at least one shared resource 902 to perform the requested activity.

Figure 10:
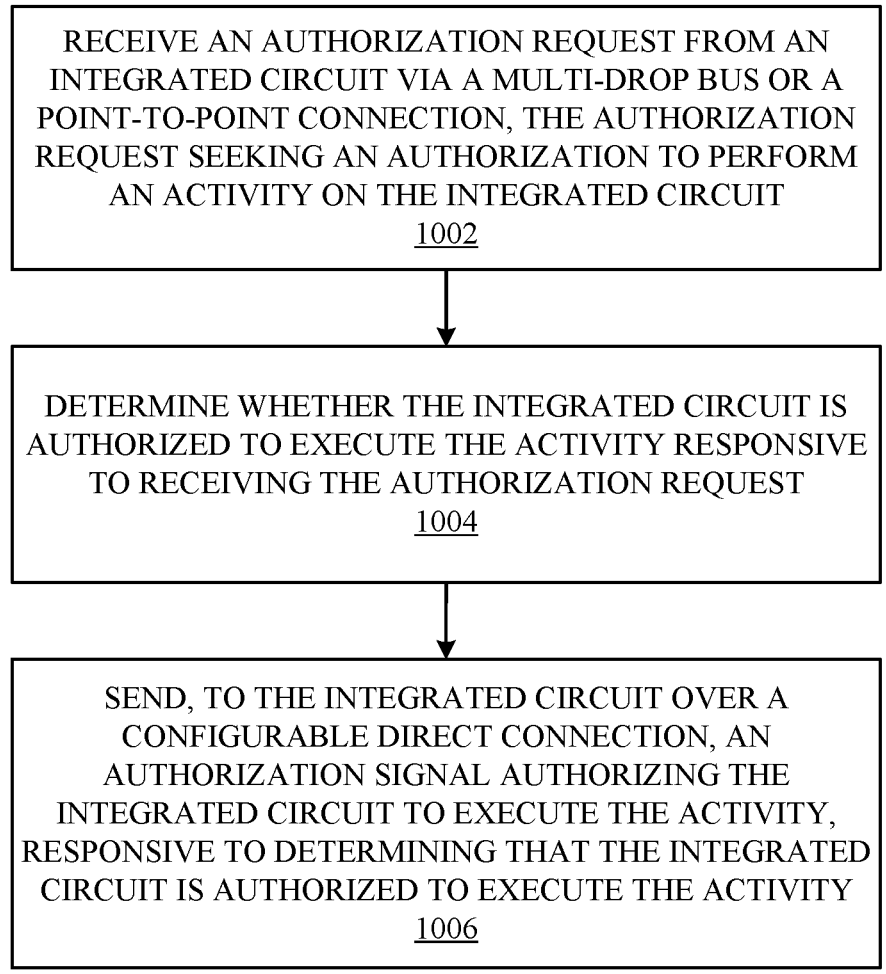
FIG. 10 is a flowchart illustrating a process of coordinating operations between components of the electronic device, according to one embodiment.

FIG. 10 is a flowchart illustrating a process of coordinating operations between components of electronic device 100, according to one embodiment. The process illustrated in FIG. 10 can be performed by an integrated circuit (component or subsystem) of electronic device 100, such as coexistence hub device 212 or a SOC (e.g., SOC 234C).

The integrated circuit of electronic device 100 (e.g., coexistence hub device 212 or SOC 234C) receives 1002, from another integrated circuit of electronic device 100 (e.g., SOC 234B) via an interface circuit and a multi-drop bus (or a point-to-point connection), an authorization request seeking an authorization to perform an activity on the other integrated circuit. The authorization request may include at least one of: information about parameters of the activity, information about one or more resources of the integrated circuit for usage during the activity, information about a time duration of the activity, and some other information related to the activity.

The integrated circuit of electronic device 100 (e.g., coexistence hub device 212 or SOC 234C) determines 1004 whether the other integrated circuit is authorized to execute the activity responsive to receiving the authorization request. In some embodiments, an arbiter circuit of the integrated circuit connected to a configurable direct connection (e.g., GPIOs 228B or GPIOs 228C) is configured to execute a policy received from a central processor (application processor 208) of electronic device 100 to determine whether the other integrated circuit is authorized to execute the activity. In some other embodiments, the integrated circuit is configured to initiate an interrupt to generate an authorization signal responsive to receiving the authorization request.

The integrated circuit of electronic device 100 (e.g., coexistence hub device 212 or SOC 234C) sends 1006, to the other integrated circuit over the configurable direct connection, an authorization signal authorizing the other integrated circuit to execute the activity, responsive to determining that the other integrated circuit is authorized to execute the activity. The integrated circuit is configured to receive the authorization request via the interface circuit and the multi-drop bus (or the point-to-point connection) within a first time limit after the other integrated circuit sends the authorization request. The integrated circuit is further configured to send the authorization signal over the configurable direct connection (e.g., GPIOs 228B or GPIOs 228C) within a second time limit after receiving the authorization request. The second time limit may be shorter than the first time limit.

The processes and their sequences illustrated in FIG. 10 are merely illustrative. Additional processes may be added and some processes in FIG. 10 may be omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A first integrated circuit, comprising:
an interface circuit configured to communicate with a second integrated circuit over a multi-drop bus in an electronic device; and
a processor circuit configured to:
receive an authorization request from a third integrated circuit over a configurable direct connection separate from the multi-drop bus, the authorization request associated with authorization to execute an activity at the third integrated circuit,
responsive at least in part to the received authorization request, determine whether the third integrated circuit is authorized to execute the activity, and
responsive to the determination, send a response signal to the third integrated circuit over the configurable direct connection.

2. The first integrated circuit of claim 1, wherein the processor circuit is further configured to:
perform, within a time limit, an internal arbitration to determine whether the third integrated circuit is authorized to execute the activity; and
send, within the time limit based on the internal arbitration, the response signal to the third integrated circuit over the configurable direct connection.

3. The first integrated circuit of claim 1, wherein the received authorization request is further associated with access to a resource of the first integrated circuit for execution of the activity, and the processor circuit is further configured to:
send, responsive to the determination, a grant signal or a denial signal to the third integrated circuit over the configurable direct connection to grant or deny access to the resource to the third integrated circuit.

4. The first integrated circuit of claim 3, wherein:
the interface circuit is further configured to receive, from the second integrated circuit via the multi-drop bus, information about availability of the resource for a defined time period; and
responsive to the received availability information, the processor circuit is further configured to send the grant signal or the denial signal to the third integrated circuit over the configurable direct connection.

5. The first integrated circuit of claim 1, wherein the processor circuit is further configured to:
receive, from the third integrated circuit over the configurable direct connection, information about a priority and a persistence of the activity; and
determine whether the third integrated circuit is authorized to execute the activity based in part on the received information.

6. The first integrated circuit of claim 1, wherein the received authorization request is further associated with access to a resource shared by the first integrated circuit and the third integrated circuit, and the processor circuit is further configured to:
send, responsive to the determination, a grant signal or a denial signal over the configurable direct connection to the third integrated circuit to grant or deny access to the shared resource to the third integrated circuit.

7. The first integrated circuit of claim 6, wherein:
the interface circuit is further configured to receive, from the second integrated circuit via the multi-drop bus, information about availability of the shared resource for a defined time period; and
the processor circuit is further configured to send the grant signal or the denial signal to the third integrated circuit over the configurable direct connection in response to the received availability information.

8. The first integrated circuit of claim 1, wherein:
the interface circuit is further configured to coordinate, within a time limit, with the second integrated circuit over the multi-drop bus in relation to the activity; and the processor is further configured to:
- perform, within the time limit, an internal arbitration in relation to the activity,
- determine, within the time limit based on the coordination and the internal arbitration, whether the third integrated circuit is authorized to execute the activity, and
- send, after the time limit based on the determination, the response signal to the third integrated circuit over the configurable direct connection.

9. The first integrated circuit of claim 8, wherein the response signal comprises a grant signal or a denial signal for granting or denying to the third integrated circuit access to a resource for execution of the activity at the third integrated circuit.

10. The first integrated circuit of claim 8, wherein the response signal comprises a configuration signal for configuring at least one resource to a new state preferred for the activity requested by the third integrated circuit, and the at least one resource is shared by the first integrated circuit and the third integrated circuit.

11. A method of coordinating operations of electronic components in an electronic device at a first integrated circuit of the electronic device, the method comprising:
- communicating with a second integrated circuit over a multi-drop bus in the electronic device;
- receiving an authorization request from a third integrated circuit over a configurable direct connection separate from the multi-drop bus, the authorization request associated with authorization to execute an activity at the third integrated circuit;
- responsive at least in part to the received authorization request, determining whether the third integrated circuit is authorized to execute the activity; and
- responsive to the determination, sending a response signal to the third integrated circuit over the configurable direct connection.

12. The method of claim 11, further comprising:
- performing, within a time limit, an internal arbitration to determine whether the third integrated circuit is authorized to execute the activity; and
- sending, within the time limit based on the internal arbitration, the response signal to the third integrated circuit over the configurable direct connection.

13. The method of claim 11, wherein the received authorization request is further associated with access to a resource of the first integrated circuit for execution of the activity, and the method further comprising:
- sending, responsive to the determination, a grant signal or a denial signal to the third integrated circuit over the configurable direct connection to grant or deny access to the resource to the third integrated circuit;
- receiving, from the second integrated circuit via the multi-drop bus, information about availability of the resource for a defined time period; and
- responsive to the received availability information, sending the grant signal or the denial signal to the third integrated circuit over the configurable direct connection.

14. The method of claim 11, further comprising:
- receiving, from the third integrated circuit over the configurable direct connection, information about a priority and a persistence of the activity; and
- determining whether the third integrated circuit is authorized to execute the activity based in part on the received information.

15. The method of claim 11, further comprising:
- coordinating, within a time limit, with the second integrated circuit over the multi-drop bus in relation to the activity;
- performing, within the time limit, an internal arbitration in relation to the activity;
- determining, within the time limit based on the coordination and the internal arbitration, whether the third integrated circuit is authorized to execute the activity; and
- sending, after the time limit based on the determination, the response signal to the third integrated circuit over the configurable direct connection.

16. The method of claim 15, wherein sending the response signal further comprises:
- sending a grant signal or a denial signal to the third integrated circuit over the configurable direct connection for granting or denying to the third integrated circuit access to a resource for execution of the activity at the third integrated circuit.

17. The method of claim 15, wherein sending the response signal further comprises:
- sending a configuration signal to the third integrated circuit over the configurable direct connection for configuring at least one resource to a new state preferred for the activity requested by the third integrated circuit, and the at least one resource is shared by the first integrated circuit and the third integrated circuit.

18. An electronic device, comprising:
- a multi-drop bus; and
- a first integrated circuit connected to a second integrated circuit via the multi-drop bus and to a third integrated circuit via a configurable direct connection separate from the multi-drop bus, the first integrated circuit configured to:
  - receive an authorization request from the third integrated circuit over the configurable direct connection, the authorization request associated with authorization to execute an activity at the third integrated circuit,
  - responsive at least in part to the received authorization request, determine whether the third integrated circuit is authorized to execute the activity, and
  - responsive to the determination, send a response signal to the third integrated circuit over the configurable direct connection.

19. The electronic device of claim 18, wherein the first integrated circuit is further configured to:
- perform, within a time limit, an internal arbitration to determine whether the third integrated circuit is authorized to execute the activity; and
- send, within the time limit based on the internal arbitration, the response signal to the third integrated circuit over the configurable direct connection.

20. The electronic device of claim 18, wherein the first integrated circuit is further configured to:
- coordinate, within a time limit, with the second integrated circuit over the multi-drop bus in relation to the activity;
- perform, within the time limit, an internal arbitration in relation to the activity;
- determine, within the time limit based on the coordination and the internal arbitration, whether the third integrated circuit is authorized to execute the activity; and
- send, after the time limit based on the determination, the response signal to the third integrated circuit over the configurable direct connection.

\* \* \* \* \*